(12) United States Patent
Bonifas et al.

(10) Patent No.: US 10,401,238 B2
(45) Date of Patent: Sep. 3, 2019

(54) FORCE RESPONSIVE INDUCTORS FOR FORCE SENSORS

(71) Applicant: 3M INNOVATIVE PROPERTIES COMPANY, Saint Paul, MN (US)

(72) Inventors: Andrew P. Bonifas, Woodbury, MN (US); Jaewon Kim, Woodbury, MN (US); Jung-Ju Suh, Seoul (KR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 212 days.

(21) Appl. No.: 15/120,809

(22) PCT Filed: Feb. 23, 2015

(86) PCT No.: PCT/US2015/017096
§ 371 (c)(1),
(2) Date: Aug. 23, 2016

(87) PCT Pub. No.: WO2015/130610
PCT Pub. Date: Sep. 3, 2015

(65) Prior Publication Data
US 2018/0202873 A1 Jul. 19, 2018

Related U.S. Application Data

(60) Provisional application No. 61/944,596, filed on Feb. 26, 2014, provisional application No. 61/944,597, filed on Feb. 26, 2014.

(51) Int. Cl.
*G01L 1/14* (2006.01)
(52) U.S. Cl.
CPC ..................................... *G01L 1/14* (2013.01)

(58) Field of Classification Search
CPC .............. G01L 1/12; G01L 1/127; G01L 1/14
(Continued)

(56) References Cited

U.S. PATENT DOCUMENTS 3,490,424 A  1/1970  Hoelle
5,209,967 A  5/1993  Wright
(Continued)

FOREIGN PATENT DOCUMENTS

AT   507293    4/2010
EP   0727756   8/1996
(Continued)

OTHER PUBLICATIONS

"Information about Dow Corning Brand Silicone Encapsulants".*
(Continued)

*Primary Examiner* — Benjamin R Schmitt
(74) *Attorney, Agent, or Firm* — X. Christina Huang; Lynn R. Hunsberger

(57) ABSTRACT

In some examples, a sensor comprises a circuit including an inductor. The inductor comprises an inductor layer, a reference layer comprising at least one of an electrically conductive material or a magnetic material, and a variable layer formed between the reference layer and inductor layer. A thickness of the variable layer may be configured to change upon application of a force external to the variable layer thereby causing a change in position of the reference layer relative the inductor layer, and the change in position of the reference layer relative the inductor layer changes an inductance of the inductor. The sensor may be configured to detect the force based on the change in inductance of the inductor.

19 Claims, 32 Drawing Sheets

(58) Field of Classification Search
USPC ...... 73/862.621, 862.625, 862.626, 862.636, 73/862.69
See application file for complete search history.

(56) References Cited

U.S. PATENT DOCUMENTS

| | | | |
|---|---|---|---|
| 6,025,725 A * | 2/2000 | Gershenfeld | H01F 17/0006 |
| | | | 324/652 |
| 8,261,607 B2 | 9/2012 | Coates | |
| 8,318,099 B2 | 11/2012 | Potyrailo | |
| 2004/0265150 A1 * | 12/2004 | McElfresh | B81B 3/0035 |
| | | | 417/413.1 |
| 2005/0146413 A1 * | 7/2005 | Carberry | H01C 10/12 |
| | | | 338/47 |
| 2006/0137913 A1 | 6/2006 | Dicko | |
| 2008/0007253 A1 | 1/2008 | Takahata | |
| 2012/0065561 A1 * | 3/2012 | Ballas | A61H 9/0021 |
| | | | 601/152 |
| 2012/0297888 A1 * | 11/2012 | Nagarajan | G01B 7/16 |
| | | | 73/774 |
| 2013/0098170 A1 | 4/2013 | Lee | |

FOREIGN PATENT DOCUMENTS

| | | |
|---|---|---|
| EP | 1331547 | 7/2003 |
| EP | 2028586 | 2/2009 |
| JP | S60-060516 | 4/1985 |
| KR | 820000304 | 3/1982 |
| WO | WO 2011-029575 | 3/2011 |
| WO | WO 2011-066028 | 6/2011 |
| WO | WO 2014-005769 | 1/2014 |

OTHER PUBLICATIONS

Gokturk, "Electric and Magnetic Properties of a Thermoplastic Elastomer Incorporated with Ferromagnetic Powders," IEEE Transactions on Magnetics, Nov. 1993, vol. 29, No. 6, pp. 4170-4176.
Olah, "Application of Ferrite-Rubbers as Sensors" Journal of Electrical Engineering, 2006, vol. 57, No. 8/S, pp. 147-150.
Yin, "Magnetic Properties of Randomly Dispersed Magnetic Particulate Composites: A Theoretical Study," Physical Review B, Aug. 2005, vol. 72, No. 5, pp. 054409-1-054409-6.
International Search Report for PCT International Application No. PCT/US2015/017098, dated Jun. 12, 2015, 4pgs.
International Search Report for PCT International Application No. PCT/US2015/017096, dated Jul. 6, 2015, 4pgs.

* cited by examiner

FORCE RESPONSIVE INDUCTORS FOR FORCE SENSORS

CROSS REFERENCE TO RELATED APPLICATIONS

This application is a national stage filing under 35 U.S.C. 371 of PCT/US2015/017096, filed Feb. 23, 2015, which claims the benefit of both U.S. Provisional Patent Application No. 61/944,596, filed Feb. 26, 2014, and U.S. Provisional Patent Application No. 61/944,597, filed Feb. 26, 2014, the disclosures of which are incorporated by reference in their entirety herein.

TECHNICAL FIELD

The disclosure relates to sensors for monitoring the application of force.

BACKGROUND

A growing interest within some industries is to embed sensor elements or arrays, which detect force/pressure, temperature, pH, or other parameters, into existing and new product lines. Development of sensors with enabling form factors, low sensor system cost, and wireless communication represent technological challenges for implementation of such embedded sensors systems.

SUMMARY

In some examples, the disclosure relates to inductors and force sensors that include such inductors, as well as systems, devices, and techniques employing such inductors and force sensors. In some examples, the force sensors may be configured to measure or otherwise detect the application of a force, such as, e.g., compression force and/or tension force, based on the inductance, and change thereof, of the inductor. Examples of the disclosure include both wired and wireless force sensors.

To detect the application of a force, the force sensor may include a sensing circuit using an inductor, the inductance of which is configured to vary based on application of force. For example, the inductor may include an inductor layer, a reference layer including at least one of a conductive material or a magnetic material, and a variable layer between the reference layer and inductor layer. The variable layer may be configured such that the thickness and/or other dimension of the variable layer may change upon application of a force external to the inductor. Such change in the variable layer results in a change in position of the reference layer relative the inductor layer, hence, changing the inductance of the inductor. By monitoring the changes in inductance of the inductor of the sensing circuit, the force applied external to the inductor may be measured or otherwise detected.

In one embodiment, the disclosure is directed to an inductor comprising an inductor layer, a reference layer comprising at least one of an electrically conductive material or a magnetic material, and a variable layer formed between the reference layer and inductor layer. A thickness of the variable layer may be configured to change upon application of a force external to the variable layer thereby causing a change in position of the reference layer relative the inductor layer, and the change in position of the reference layer relative the inductor layer may change an inductance of the inductor.

In another embodiment, the disclosure is directed to a sensor comprising a circuit including an inductor. The inductor comprises an inductor layer, a reference layer comprising at least one of an electrically conductive material or a magnetic material, and a variable layer formed between the reference layer and inductor layer. A thickness of the variable layer may be configured to change upon application of a force external to the variable layer thereby causing a change in position of the reference layer relative the inductor layer, and the change in position of the reference layer relative the inductor layer changes an inductance of the inductor. The sensor may be configured to detect the force based on the change in inductance of the inductor.

In another embodiment, the disclosure is directed to an article comprising a sensor. The sensor may include a circuit, where the circuit includes an inductor. The inductor comprises an inductor layer, a reference layer comprising at least one of an electrically conductive material or a magnetic material, and a variable layer formed between the reference layer and inductor layer. A thickness of the variable layer may be configured to change upon application of a force external to the variable layer thereby causing a change in position of the reference layer relative the inductor layer, and the change in position of the reference layer relative the inductor layer changes an inductance of the inductor. The sensor is configured to detect the external force based on the change in inductance of the inductor.

In another embodiment, the disclosure is directed to a system comprising an inductor. The inductor may include an inductor layer that includes an input connection and an output connection, a reference layer comprising at least one of an electrically conductive material or a magnetic material, and a variable layer formed between the reference layer and inductor layer. A thickness of the variable layer may be configured to change upon application of a force external to the variable layer, thereby causing a change in position of the reference layer relative the inductor layer, and the change in position of the reference layer relative the inductor layer changes an inductance of the inductor. The system may further comprise a circuit coupled to the inductor via the input and output connectors.

The details of one or more embodiments of the invention are set forth in the accompanying drawings and the description below. Other features, objects, and advantages of the invention will be apparent from the description and drawings, and from the claims.

DETAILED DESCRIPTION

In some examples, the disclosure relates to inductors and to a force sensor that includes such inductors, as well as systems, devices, and techniques employing such inductors and force sensors. As will be described herein, example force sensors may be designed to include inductors with sensitivity to applied force. In particular, an inductor may be configured such that the inductance of inductor changes with the application of force or pressure, such as, e.g., compression force and/or tension force. To sense the application force, the force sensors may include one of more of the inductors in a sensing circuit, e.g., a passive LC resonant circuit, in a manner that allows for a change in inductance due to the application of force to be monitored. In some examples, the force responsive inductor may be a planar, flexible inductor, e.g., incorporated into a series LC resonant circuit, which is suitable for platforms requiring flexible, passive, wireless, and/or disposable force sensor arrays.

As described above, in some examples, the force responsive inductor may comprise of a reference layer, a variable layer, and an inductor layer. The reference layer and inductor layer are physically separated by a variable layer. The reference layer may include at least one of an electrically conductive material or a magnetic material. In some examples, the reference layer may be a patterned layer or a substantially continuous layer. The inductor may be a passive, two-terminal electrical element which resists a change in passing electrical current.

In the case of a reference layer including an electrically conductive material, upon application of a force external the inductor, the dimensional change of the variable layer (e.g., change in thickness) may result in a change in the conductive coupling between the electrically conductive material and inductor layer, thereby leading to an inductance change of the inductor layer. Similarly, in the case of a reference layer including magnetic material, upon application of a force external the inductor, the dimensional change of the variable layer may result in a magnetic coupling change between the magnetic material and inductor layer, thereby leading to an inductance change of the inductor layer. The incorporation of such an inductor, e.g., into a passive LC resonant circuit, enables the inductance change to be wirelessly monitored through a resonant frequency shift, thus allowing passive and wireless force sensing. As will be described below, the force sensitivity and range of forces capable of being sensed by a force sensor including such an inductor is predominantly governed by the mechanics of the variable layer. In addition to wireless applications, the described sensors can be monitored via a wired connection.

Figure 1:
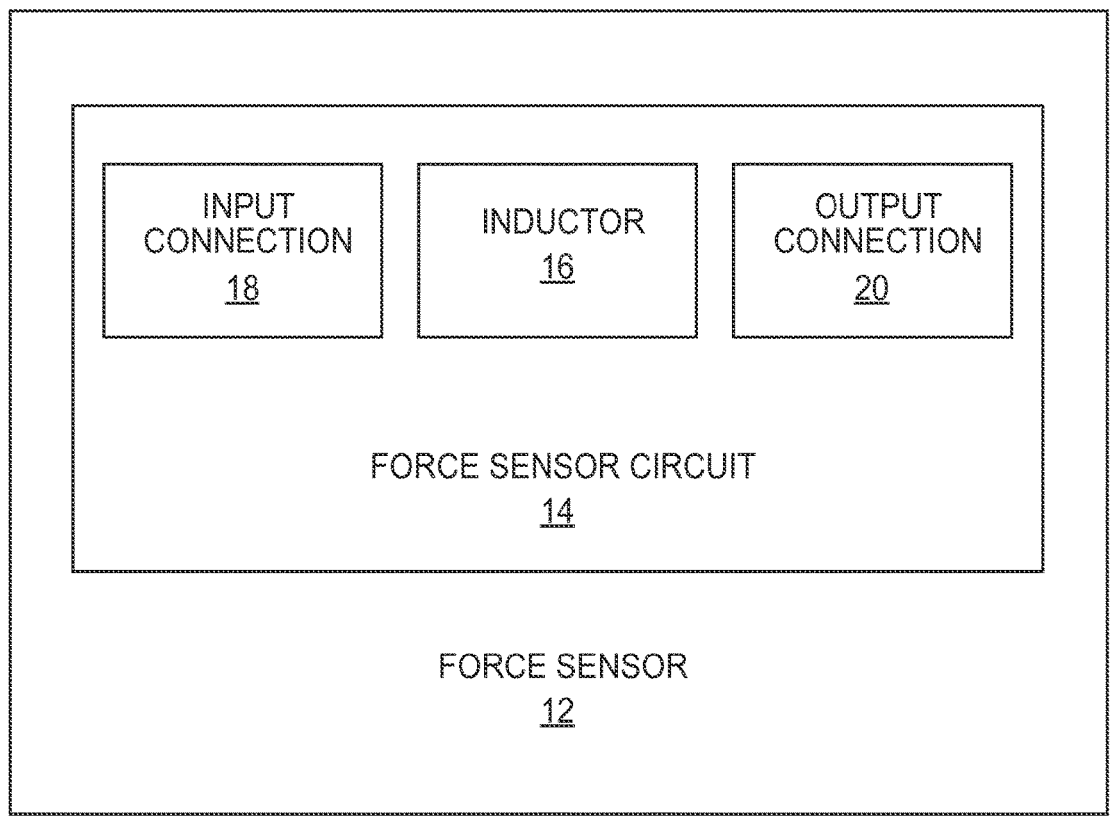
FIG. 1 is a conceptual diagram illustrating an example force sensor for sensing the application of a force.

FIG. 1 is a conceptual diagram illustrating an example force sensor 12 that may sense the application of a force using sensing circuit 14. Sensor circuit 14 may include inductor 16. Inductor 16 may be electrically coupled to the other components of sensing circuit 14 via input connection 18 and output connection 20. Input connection 18 and output connection 20 may take the form of any electrical connection suitable for electrically coupling inductor 16 to remainder of sensor circuit 14 to allow current to flow from the input terminal to the output terminal of inductor 16.

Force sensor 12 may be configured to detect the application of force or pressure to sensor 12, and, more particularly, to inductor 16, via sensing circuit 14. In some examples, sensor 12 may be used to detect whether or not a force has or is being applied relative to some reference state without regard to the magnitude of the force. In other examples, sensor 12 may also be used to detect of the magnitude of a detected applied force. Sensor 12 may be configured to monitor the application of force on a continuous or periodic basis. Force sensor 12 may be employed in various applications for which it is desirable to detect the application of force. For example, force sensor 12 may be incorporated into compression bandaging although other applications are contemplated. Other example applications are described further below.

Sensor circuit 14 may take the form of any electrical circuit for which it is possible to detect or otherwise sense a change in the inductance of inductor 16. For ease of description, examples of sensor circuit 14 are primarily described in this disclosure in the form of an LC resonant circuit, where the change of inductance of inductor 16 is detected based on resonant frequency shifts of circuit 14. As will be described further below, the magnitude of an applied force may be determined or estimated in view of a detected resonant frequency shift through a predetermined force-resonant frequency relationship. In the case of wired applications, inductor 16 may be a discrete element in sensor circuit 14. Conversely, in the case of wireless applications, inductor 16 may be an antenna element in sensor circuit 14.

Examples of sensor circuit 14 are not limited to LC resonant circuits and other suitable circuits and techniques may be employed to sense force using sensing circuit 14. For example, sensor circuit 14 may be one or more of a radio frequency identification circuit, a remote interrogation circuit, an inductance measuring circuit, an impedance measuring circuit, a resonant frequency measuring circuit, inductance bridge circuit, and a triggering circuit that triggers an event based on the inductance.

As will be described further below, inductor 16 may be force responsive in the sense that the inductance of inductor 16 may vary based on the application of a force external to inductor 16. By employing such a force responsive inductor, force sensor 12 may be a sensor platform where an applied force is remotely monitored by measuring the resonant frequency shift of sensor circuit 14 (e.g., LC resonant circuit) including force responsive inductor 16. As will be described further below, the sensitivity and sensitivity range of force sensor 12 may be governed, e.g., by the mechanics of a variable layer, such as variable layer 26 of inductor 16 described in further detail below. The magnitude and direction of the resonant frequency shift may be directly related to the magnitude and type of applied force or pressure.

As will be apparent from the disclosure, pressure responsive inductors, such as inductor 16, represent an attractive platform that is suitable for straightforward integration into wireless and wired monitoring methodologies via measuring resonant frequency shifts of a LC resonant circuit. The resonant frequency (fo) of a LC resonant circuit can be given by the following equation:

$$f_o = \frac{1}{2\pi\sqrt{LC}} \quad (1)$$

where L is the effective inductance and C is the effective capacitance of the circuit. For an LC resonant circuit with a force invariant capacitance, incorporating force responsive inductor 16 into sensor circuit 14 allows the determination of an applied force, e.g., through a predetermined force-resonant frequency relationship.

Figure 2A:
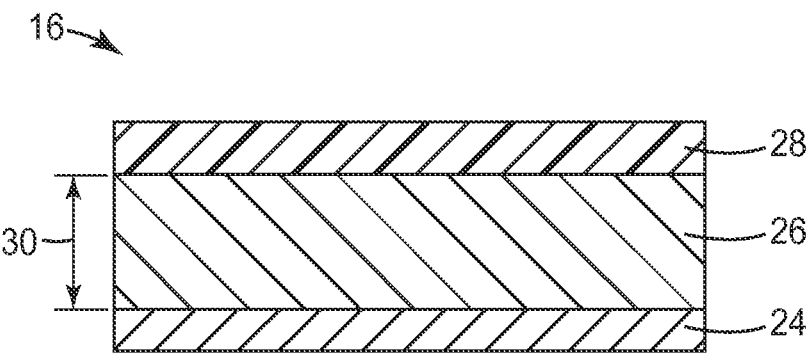
FIGS. 2A and 2B are conceptual diagrams illustrating the example inductor of FIG. 1.
Figure 2B:
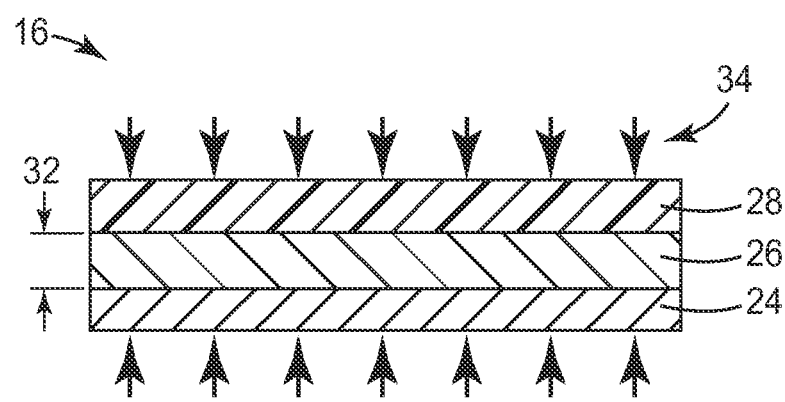

FIGS. 2A and 2B are conceptual diagrams illustrating inductor 16 of sensing circuit 14 in FIG. 1. As shown, inductor 16 may include inductor layer 24, variable layer 26, and reference layer 28. Inductor layer 24 is separated from reference layer 28 by variable layer 26. FIG. 2A represents the state of inductor 16 in which substantially no force is being applied external to inductor 16. Conversely, FIG. 2B represents the state of inductor 16 in which external force 34 is being applied external to inductor 16, e.g., in the form of a compressive force applied substantially parallel to the direction in which inductor layer 24, variable layer 26, and reference layer 28 are stacked. FIG. 2A and FIG. 2B represent the reference 28, variable layer 26, and inductor layer 24 as the same length and thickness. However, the layers may be of variable lengths and thicknesses relative to one another.

As illustrated by FIGS. 2A and 2B, the application of external force 34 causes a dimensional change in variable layer 26. In particular, FIGS. 2A and 2B illustrate the reduction in an initial thickness 30 of variable layer 26 (FIG. 2A) to a compressed thickness 32 under the application of external force 34. The change of variable layer 26 from initial thickness 30 to compressed thickness 32 results in a change in the position of reference layer 28 relative to inductor layer 24. As described herein, the properties of inductor are such that the inductance of inductor 16 changes as a result of the change in the position of the reference layer 28 relative to inductor layer 28. As noted above, inductor 16 may be incorporated into sensor circuit 12, which is configured to detect the change in the inductance of inductor 16 to detect the application external force 34.

External force 34 may be applied to inductor 16 as a result of a variety of reasons and may range in magnitude based on the particular application of force sensor 12. For example, force sensor 12 may be employed in a compression bandage, e.g., to measure the pressure or "tightness" of the bandage when wrapped. In such an example, external force 34 may be pressure applied by one or more layers of the compression bandage wrapped on top of force sensor 12. One or more force sensors 12 may also be applied directly to the skin and the compression bandage wrapped around or the one or more force sensors 12 may be embedded in the one or more layers of the compression bandage. In another example, the force sensor 12 may be employed in other medical or veterinary products, such as a surgical drape or tape, to measure an applied force such as a compression wraps and pressure relieving devices. In another example, the force sensor 12 may be placed inside of personal protective equipment (PPE) such as hearing protection or ear muffs, respirators masks, and eye or safety glasses. In another example, the force sensor 12 may also be placed in apparel such as shoes to monitor the impact of the foot and shirts or jackets to potentially monitor heart rate. It may also be used to sense occupancy or presence by incorporating the force sensor 12 into a seat. In another example, the force sensor 12 may be incorporated into a polished or abrasive pad to monitor pad durability or the pressure applied to an object by the pad.

For ease of illustration, in FIGS. 2A and 2B, the dimension change in variable layer 26 due to application of external force 34 shown in terms of a reduction from initial thickness 30 to compressed thickness 32. However, a uniform change in thickness of variable layer 26 is not the only mechanism which causes a change in the inductance of inductor 32 upon application of external force 34. Rather, any dimensional change in variable layer 26 from the application of external force 34 that causes a change in the position of reference layer 28 relative to inductor layer 24, thereby causing a change in the inductance of inductor 16, is contemplated for the examples described herein. The change in thickness of variable layer 26 does not need to be uniform for a change in the inductance of inductor 16 to result.

Further, the application of external force 34 to inductor 16 in FIGS. 2A and 2B is show as a compressive force, e.g., caused by an increase in external pressure. However, the detection of other types of external forces via inductor 16 due the change in the position of reference layer 28 and inductor layer 24 relative to each other are contemplated. For example, external force 34 may take the form of a pressure or a tension, compression, bending, or shear force or any combination thereof. In the case the external force 34 is in the form of a tension force, the change in position of reference layer 28 relative to inductor layer 24 may result from, e.g., an increase in the initial thickness 30 of variable layer 26 rather than a decrease in thickness.

Inductor layer 24 may be formed of any suitable conductive material with low resistive loss. For example, inductor layer 24 may be assembled of a single layer or multiple layers of aluminum or copper. The inductive layer 24 may be single or multi-turn of various shapes including spiral or square spiral. Depending upon the intended application, the inductive layer 24 thicknesses may vary from, on average, 100 nanometers to 500 microns. As an example, the inductive layer 24 thickness for a force sensor 12 in a compression bandage application is 1 to 4 microns. Inductance of the inductive layer varies from 10 nanohenries to 1 millihenry. As an example, for a compression bandage application, the inductance will vary from 100 nanohenries to 10 microhenries.

Variable layer 26 may be formed on any suitable material that allows for a dimensional change upon application of external force 34. For a compressive force, variable layer 26 may be configured to compress, e.g., by decreasing in thickness. For a tension force, variable layer may be configured to expand, e.g., by increasing in thickness. In some examples, variable layer 26 may be a polymeric foam layer. Example polymeric foams may include polyurethane, polystyrene, polyethylene, polyolefins, or biogradeable polymers such as polyvinylacetate (PVA), silicone or urethane crosslinked acrylates, flouropolymers, or starch. Foams may be open or closed cell and may contain an integral skin that encompasses the foam. The integral skin may include polyurethane, polystyrene, polyethylene, polyolefins, or biodegradable polymers such as polyvinvlacetate (PVA). Rubbers, elastomers, hydrogels, gels, or plastics may also be used to assemble the variable layer 26. The variable layer 26 may be characterized by time dependent mechanical properties such as the Elastic Modulus and compression set or creep.

Variable layer 26 may be formed of various materials with or without mechanical structuring designed to be compliant within the expected force range. For example, for a compressive force, variable layer 26 may be formed such that under compressive force 34 that is estimated to be the maximum external force applied to inductor 16, variable layer 26 decreases to a compressed thickness 32 that is, e.g., less than approximately 75% or less than approximately 50% of initial thickness 30 of variable layer. In this manner, sensor 12 may be able to detect an external force up to the maximum external force estimated to be applied to inductor 16 since variable layer 26 may exhibit a dimensional change up to the maximum estimated external force and beyond. In some examples, variable layer 26 may have an initial thickness 30 between approximately 100 microns and approximately 3 centimeters such as, e.g., between approximately 1 millimeter and approximately 5 millimeters.

Reference layer 28 may have any suitable composition and configuration. Reference layer 28 may include at least one of a magnetic material or electrically conductive material. For example, reference layer 28 may include a plurality of magnetic particles dispersed in a matrix material. Example magnetic particles include ferri and ferromagnetic containing iron or iron oxides with regular or irregular shape (e.g., spheres, rods, or flakes). Example matrix materials in which the magnetic particles are dispersed include polymeric foam, polymeric resin, and elastomeric resin. Polymeric foams, resins, and elastomeric resins may include polyurethane, polystyrene, polyethylene, polyolefins, or biogradeable polymers such as polyvinylacetate (PVA), silicone or urethane crosslinked acrylates, flouropolymers, or starch. Foams may be open or closed cell and may contain an integral skin that encompasses the foam. Rubbers, elastomers, hydrogels, gels, or plastics may also be used to assemble the reference layer 28. In other examples, reference layer 28 may be formed of a thin magnetic sheet or film such as a sintered ferrite sheet. Additionally or alternatively, reference layer 28 may include an electrically conductive material. For example, reference layer 28 may be a conductive film such as a copper or aluminum film or tape.

Reference layer 28 may exhibit any suitable thickness. For example, reference layer 28 may have a thickness 30 between approximately 10 nanometers and approximately 1 millimeter, such as, e.g., between approximately 100 nanometers and approximately 200 microns. In some examples, the thickness of reference layer 28 may vary upon application of external force 34 along with variable layer 28, e.g., in cases in which reference layer 28 includes magnetic particles dispersed in a foam matrix material.

In examples in which reference layer 28 includes a magnetic material, reference layer 28 may exhibit a magnetic permeability of greater than approximately 2, such as, e.g., greater than approximately 20. In cases in which reference layer 28 includes a magnetic material, when external force 34 is applied and the position of reference layer 28 changes relative to inductor layer 24 because of the dimensional change in variable layer 26, the inductance of inductor layer 24 changes as a result of the change in the magnetic coupling with reference layer 28. In the case of a compressive force, an increase in inductance may result from increase magnetic coupling between reference layer 28 and inductor layer 24. Conversely, for a tension force, a decrease in inductance may result from a decrease in magnetic coupling between reference layer 28 and inductor layer 24.

Additionally, in the case of reference layer 28 undergoing a dimensional change upon application of external force 34, the magnetic permeability of reference layer 28 may change due to the application of external force 34. This change in permeability may also influence the change in inductance of inductor layer 24. For example, in the case of a compressive force, the magnetic permeability of reference layer 28 may increase upon a decrease in the thickness of reference layer 28, thereby increasing the inductance of inductor layer 24. Conversely, for a tension force, the magnetic permeability of reference layer 28 may decrease upon an increase in the thickness of reference layer 28, thereby decreasing the inductance of inductor layer 24.

In examples in which reference layer 28 includes an electrically conductive material, reference layer 28 may exhibit an electrical conductivity of greater than approximately 1 Siemens per centimeter (S/cm), such as, e.g., greater than approximately $10^4$ S/cm. In cases in which reference layer 28 includes an electrically conductive material, the magnetic field of inductor layer 24 induces a current (eddy current) in electrically conductive plane of reference layer 28. When external force 34 is applied and the position of reference layer 28 changes relative to inductor layer 24 because of the dimensional change in variable layer 26, the inductance of inductor layer 24 may be influenced. For example, when reference layer 28 is moved closer to inductor layer 24, the induced eddy current in electrically conductive plane of reference layer 28 is increased. The eddy current in the electrically conductive plane occurs in the opposite direction of the magnetic field generated by the inductor layer 24. The induced eddy current cancels out the magnetic field generated by the inductor layer 24, thereby resulting in decrease in inductance of the inductor layer 24 (and increase in resonant frequency of a LC circuit incorporating the inductor element). The magnitude of the induced eddy currents and opposing magnetic field is strongly dependent on the separation distance between the inductor and conductive element. Thus, this relationship may be used to monitor the application and magnitude of external force 34.

In some examples, reference layer 28 may be a substantially continuous layer formed over variable layer 26. In other examples, reference layer 28 may be a patterned layer or other discontinuous layer. For example, when reference layer 28 takes the form of an electrically conductive layer, induced eddy currents may represent an energy loss mechanism (associated with Joule heating) that may significantly decrease the quality factor of inductor 16. Since the wireless read range (signal strength) of a LC resonant circuit, such as, e.g., sensor circuit 14, with force responsive inductor 16 may be strongly dependent on the quality factor of the inductor, it may be desirable to engineer reference layer 28 when in the form of an electrically conductive layer to maximize inductance change and/or minimize energy loss during interaction between the two layers. Such engineering may include patterning reference layer 28.

When reference layer 28 takes the form of an electrically conductive layer, reference layer 28 may be patterned into electrically isolated sections or regions, e.g., through an etching, scribing, selective oxidation, or equivalent methods. The magnitude and direction of the induced eddy currents in the reference layer 28 may be manipulated by patterning properly with one or more design parameters. In other words, sensor sensitivity, frequency drift range, asymmetric sensing area, and/or sensing accuracy can be fully manipulated by patterning of reference layer 28. Example pattern design parameters include grid width, grid size, conductive pattern shapes, conductivity, and size of reference layer 28. Additionally, example pattern designs include those the figures referenced and described in the Experimental Results section below.

While patterning of reference layer 28 is described primarily with regard to examples in which reference layer 28 is an electrically conductive layer, such patterning may be employed when variable layer 28 is a magnetic layer. In some examples, there may be some limits on the use of patterned references layer. The limits of this approach can be conceptualized as a continuous conductive layer and an infinitely segmented grid of conductive regions. The continuous conductive layer would result in the largest inductance change, but the largest energy loss and the infinitely segmented grid of conductive regions would results in the lowest inductance change but causing minimal loss. This aspect is described further below with regard to FIG. 9 below.

The configuration, composition, and properties of inductor layer 24, variable layer 26, and reference layer 28 may allow inductor 16 to be used to detect external force 34 within any desirable magnitude range and sensitivity. Such magnitude, range, and sensitivity may vary based up on the application for which force sensor 12 is employed. On average, force sensor 12 may experience less than 100 kPa of pressure. Although inductor 16 is shown as being formed by inductor layer 24, variable layer 26, and reference layer 28 stacked, in that order, other layer configurations are contemplated. In some examples, inductor 16 may include more than one reference layer 28 and/or variable layer 26. For example, inductor 16 may include a plurality of reference layer 28 alternating with a plurality of variable layers 26 stacked on inductor layer 24. As another example, inductor 16 may include a plurality of inductor layers 24, variable layers 26, and reference layers 28 stacked on each other. In each case, upon application of external force 34, the resulting inductance change and, thus, resulting resonant frequency shift is dependent on the reference layer 28/inductor layer 24 coupling and interaction between individual inductor layers 28. In some examples, the dimensional change of the variable layer 26 is invariant to the mechanical properties of the means applying the force.

In one example configuration of inductor 16, reference layer 28 may include dispersed magnetic particles dispersed, e.g., substantially uniformly, in a compressible foam matrix. Example magnetic particles include ferrite magnetic particles. Reference layer 28 may be separated from inductor layer 24 by variable layer 26 in the form of an unmodified foam layer. Such a configuration combines two mechanisms which lead to the inductance of inductor 16 to increase under, e.g., application of a compressive force: (1) the magnetic permeability increase of the magnetic particle filled foam of reference layer 28; and (2) increase in magnetic coupling between the magnetic particle filled foam of reference layer 28 and inductor layer 24. Upon removal of the applied force or pressure, the foam variable layers revert back to their initial form factor. The inductance change can be wirelessly monitored with a simple LC resonant circuit. Flexible, stretchable, and lightweight sensor elements are achievable, e.g., with proper material and processing selections.

In another example configuration of inductor 16, reference layer 28 may include magnetic particles dispersed, e.g., substantially uniformly, in a flexible or elastomeric polymeric material. Example magnetic particles include ferrite particles. Reference layer 28 may be separated from inductor layer 24 by variable layer 26 in the form of an unmodified foam layer. During compression, an increase in the inductance of inductor 16 may be caused by increased magnetic coupling between reference layer 28 and inductor layer 24 as the foam variable layer 26 compresses in thickness. Again, the inductance change can be wirelessly monitored with a simple LC resonant circuit, and flexible, stretchable, and lightweight sensor elements are achievable, e.g., with proper material and processing selections.

In another example configuration of inductor 16, reference layer 28 may take the form of a magnetic sheet, such as a thin sintered magnetic sheet. Reference layer 28 may be separated from inductor layer 24 by variable layer 26 in the form of an unmodified foam layer. During compression, an increase in the inductance of inductor 16 may be caused by increased magnetic coupling between reference layer 28 and inductor layer 24 as the foam variable layer 26 compresses in thickness. The inductance change can be wirelessly monitored with a simple LC resonant circuit.

In some examples, the magnetic permeability of sintered ferrite sheets can be 1-2 orders of magnitude higher than magnetic particle loaded paramagnetic matrixes, such as polymeric or foam matrixes. Thus, such a configuration may allow for a cheaper and lighter sensor. However, ferrite sheets may also be rigid, planar, and brittle. Mechanical design principles, such as using thin ferrite sheets, neutral mechanical plane design principles, and structuring may be required to develop flexible and stretchable sensors using sinter ferrite sheets. The additional cost of these processes could lead to additional fabrication cost, e.g., compared to those examples employing references layers including magnetic particle loaded paramagnetic matrixes.

Figure 3:
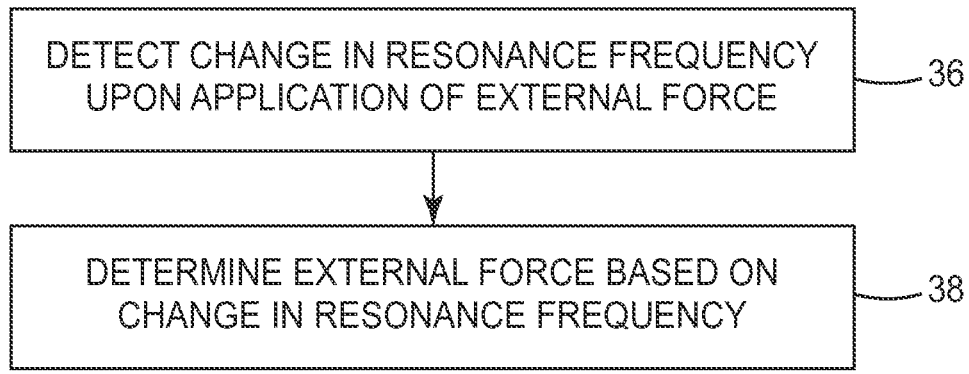
FIG. 3 is a flowchart illustrating an example technique for determining an applied force using the example for sensor of FIG. 1.

FIG. 3 is a flow diagram illustrating an example technique for detecting the application of a force using an example inductor, such as, e.g., force sensor 12 employing inductor 16 in sensor circuit 14. For ease of description, the technique of FIG. 3 is described with regard to a wireless reader or remote interrogator that includes at least one processor and memory configured to wirelessly detect changes in the resonant frequency of sensor circuit 14 and determine the application and/or magnitude of the external force or pressure based on the resonant frequency change.

As shown in FIG. 3, using sensor circuit 14, the processor of the wireless reader detects a change in resonant frequency of sensing circuit 14 upon application of external force 34 (36). As described herein, the change in resonant frequency may result from the change in the inductance of inductor 16. Based on the detected change in resonant frequency, the processor determines the presence and magnitude of the applied external force 34 (38). For example, the change in resonant frequency alone may be indicative of the application of external force 34. The processor may determine magnitude of external force 34 using any suitable technique. For example, the processor may determine the magnitude of external force 34 by comparing the resonant frequency shift to a predetermined force-resonant frequency relationship stored in memory for the sensor circuit 14.

Figure 4:
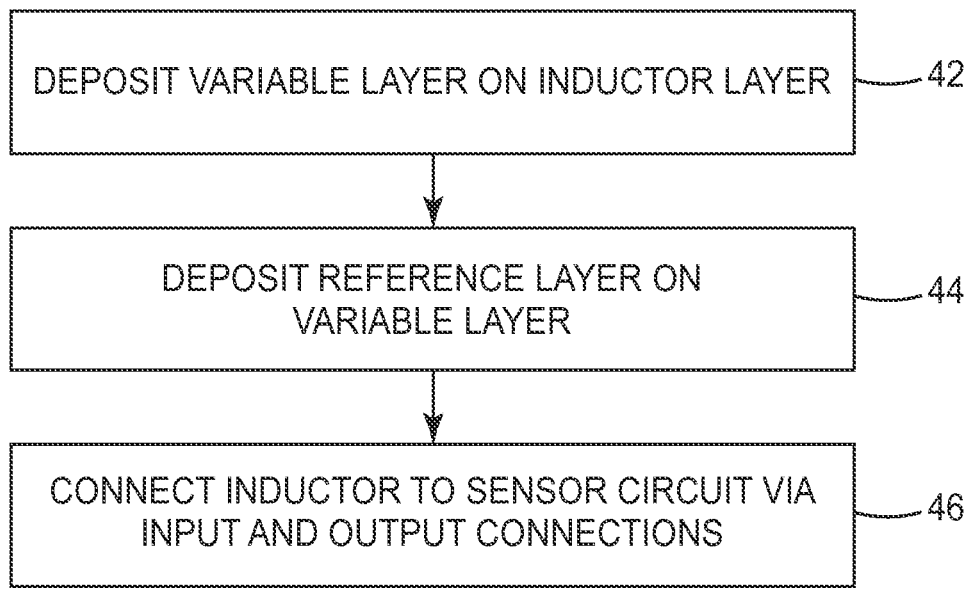
FIG. 4 is a flowchart illustrating an example technique for forming the example inductor shown in FIGS. 2A and 2B.

FIG. 4 is a flow diagram illustrating an example technique for assembly or fabrication of an inductor, such as, e.g., inductor 16 of force sensor 12. However, other suitable techniques other than that described herein may be employed to fabricate inductor 16. Variable layer 26 is deposited on inductor layer 24 (42) followed by the deposition of reference layer 28 on variable layer 26 (44). Once inductor 16 is formed, inductor 16 may be electrically coupled into sensor circuit 14 via input connection 18 and output connection 20 (46).

Figure 5:
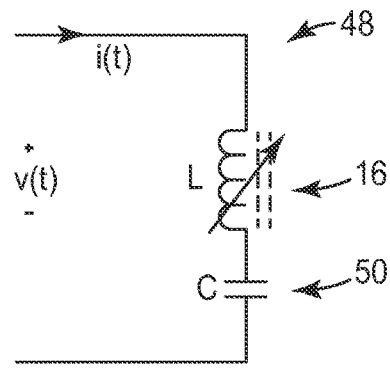
FIGS. 5-7 are circuit diagrams illustrating example circuits that may be employed in the example force sensors of the disclosure.
Figure 6:
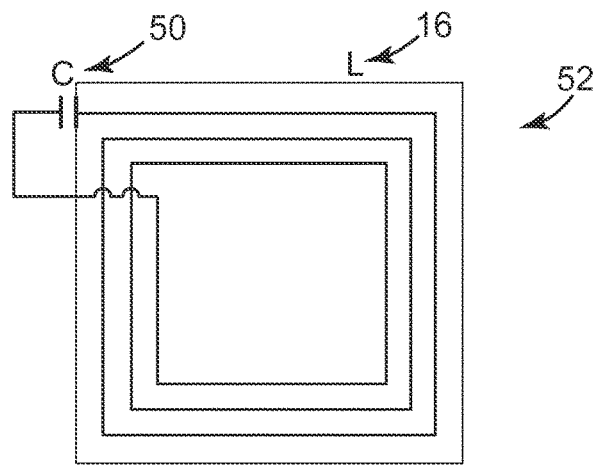
Figure 7:
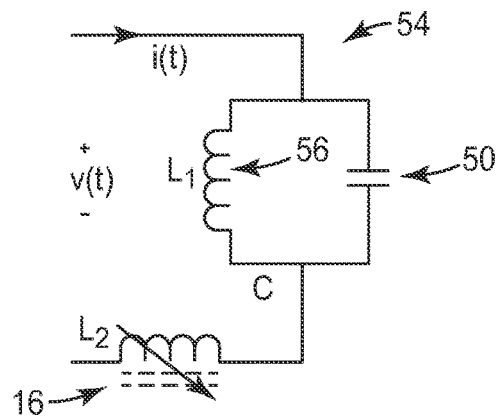

FIGS. 5-7 are diagrams illustrating example circuits that may be employed in example force sensors, such as, e.g., sensor circuit 14 of force sensor 12. As described above, in some examples, sensor circuit 14 may be an LC resonant circuit, and may be used to detect the application and/or magnitude of an external force by monitoring the resonant frequency of sensor circuit, e.g., using the technique of FIG. 5. For ease of description, the circuits of FIGS. 5-7 are described as including inductor 16. However, other force or pressure variant inductor configurations may be utilized.

FIG. 5 is a diagram illustrating LC resonant circuit 48 which may be used for wired applications in pressure sensor 12. In LC resonant circuit 48, inductor 16 may be a discrete element. As noted above, the capacitance exhibited by capacitor 50 in LC resonant circuit 48 may be substantially force invariant unlike that of inductor 16. Circuit 48 may include an antenna element for wireless reception and transmission of force or resonant frequency changes which may be separate from that of inductor 16 or the inductor may also be the antenna element. The antenna element provides a mechanism to wirelessly transmit and receive force or resonant frequency information with a reader or remote interrogator. The design of the LC resonant circuit 48 permits either a connection to an external antenna element or the LC resonant circuit 48 becomes the antenna itself.

As described above, upon application of applied force 34, the position of reference layer 28 relative to inductor layer 24 may change resulting in a change in the inductance of inductor 16. The change in inductance may result in a resonant frequency decrease of the LC resonant circuit 48. The resonant frequency of LC resonant circuit 48 may be monitored using any suitable technique. For example, the resonant frequency may be monitored with an impedance analyzer, spectrum analyzer, or simple impedance measurements at a single or several frequencies. Compared to wireless applications, the sensor size for wired applications is limited by the inductor size and not by the antenna size. In addition, wired configuration may provide higher sensitivity compared to the remote monitoring configurations for wireless applications. These monitoring techniques may employ simple or complex digital signal processing for improved sensitivity.

FIG. 6 is a diagram illustrating LC resonant circuit 52 which may be used for wireless applications in pressure sensor 12. In LC resonant circuit 52, inductor 16 may be an antenna element rather than a discrete element. Similar to circuit 48, the capacitance exhibited by capacitor 50 in circuit 52 may be substantially force or pressure invariant unlike that of inductor 16.

As described above, upon application of applied force 34, the position of reference layer 28 relative to the inductor layer 24 may change resulting in a change in the inductance of inductor 16. The change in inductance may result in a resonant frequency decrease of the LC resonant circuit 52. The resonant frequency of LC resonant circuit 52 may be wirelessly monitored using any suitable technique. For example, for remote monitoring, the resonant frequency of LC resonant circuit 52 with embedded antenna may be acquired by a wireless reader. The read range and frequency resolution of the reader or remote interrogator depends on the resonant frequency and magnetic properties of the magnetic layer, sensor and reader antenna design, and readout methods. Example magnetic materials for reference layer 28, such as ferrites, may be effective up to several GHz, although the magnetic permeability may be lower for materials with high frequency capability. Force sensor and reader antenna design for different frequency regions may maximize both sensitivity and readout distance, but there may be limitations on sensor size, e.g., such as several centimeters wide sensors in the 1-30 MHz region. Several readout mechanisms may be used including, e.g., a "ring-up, ring-down" method and impedance analysis of the reader's antenna. Such methods can be combined with simple or complex digital signal processing for improved reader sensitivity.

FIG. 7 is a diagram illustrating LC resonant circuit 54 which may be used to monitor the application of applied force in force sensor 12. As shown, LC resonant circuit 54 may include force invariant capacitor 50, force responsive inductor 16, and force invariant inductor 56. Such elements may be connected in series, parallel, or some combination thereof. The combination of force responsive inductor 16 and invariant inductor 56 allows the magnitude and direction of the resonant frequency shift to be engineered to fit a desired application. The resonant frequency of the LC circuit may be monitored through any suitable wired or wireless method, including those described herein, allowing determination of the applied force.

Examples of the disclosure have been described herein. Some examples of the disclosure may provide one or more benefits. For example, development of a low cost, disposable, and/or passive force sensor platforms with remote readout capability, such as those describe herein, may enable bi-directional (e.g. transmit and receive) communication. In some examples, a sensor platform may have several enabling form factors, such as, e.g., thin flexible sheets/films and elastomeric stretchable films, thus creating an inexpensive, passive, and wireless pressure sensor platform suitable for many applications. Several envisioned applications for the examples of the sensor platform include (although not inclusive): pressure sensing for compression dressings (e.g. Coban™ available commercially from 3M™, Maplewood, Minn. USA) to identify proper application and continuous pressure monitoring; pressure sensing for active compression systems to maintain a constant or programmable pressure regiment while maintaining safe pressure levels for the user; pressure sensing in passive or active hospital bedding to identify pressure conditions, e.g., suitable for the formation of pressure ulcers; pressure sensing in personal safety equipment such as respirators and hearing protection to ensure proper fit parameters and continuous monitoring the fit during usage; pressure sensing for consumer compression systems with supporting smart phone application; pressure monitoring for abrasive and polishing pads to allow continuous optimization of applied pressure; automotive entrance, parking, and exiting monitoring for smart parking solution systems; floor mounted sensor arrays for wireless monitoring of room occupancy and occupants motion/activity level; and proximity sensors for monitoring orientation and spacing between two surfaces, e.g., which is suitable for many applications in semiconductor and material processing systems.

In some applications, the force sensor may be configured to include an RFID circuit, where the force or pressure responsive inductor forms the RFID antenna so as to be tunable via application of force to the inductor antenna. In other applications, the force sensor may be configured to include a triggering circuit with the force responsive inductor. In such a case, the change of inductance of the inductor may trigger one or more events. For example, a change of inductance could trigger a change in internal memory of the RFID circuit or trigger a signal to be sent to a remote reader to indicate that an object with the force sensor 12 is experiencing a change in force or pressure.

EXPERIMENTAL RESULTS

To evaluate one or more aspects of examples of the disclosure, tests were performed on two example wired force sensors having the same configuration. The experimental setup consisted of a digital micrometer, a digital load cell, acrylic (non-magnetic, non-conductive) compression plates, a planar spiral inductor fabricated on a FR4 circuit board, and a LCR meter. The variable layer of the inductor was formed from polyurethane foam (PUF) extracted from the 3M™ Coban™ 2 Lite Compression System (available commercially from 3M™, Maplewood, Minn.). The initial inductance (at pressure=0 kPa) and inductance change were monitored as a function of compressive strain (measured with micrometer) and stress (measured with load cell).

Figure 8A:
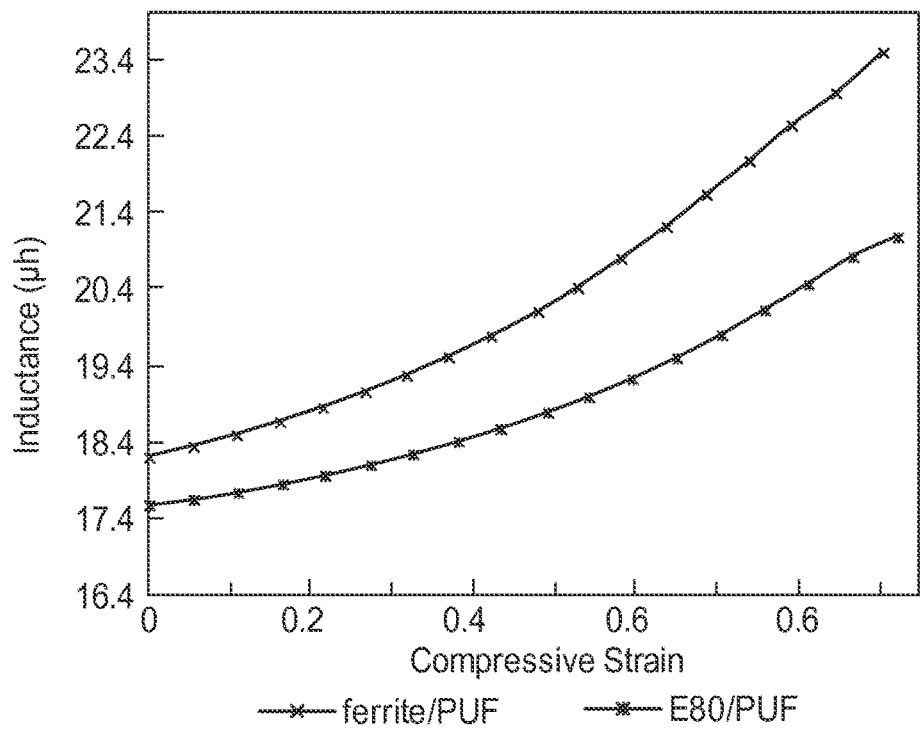
FIGS. 8A-8F are plots illustrating results of various experiments carried out to evaluate examples of the disclosure.
Figure 8B:
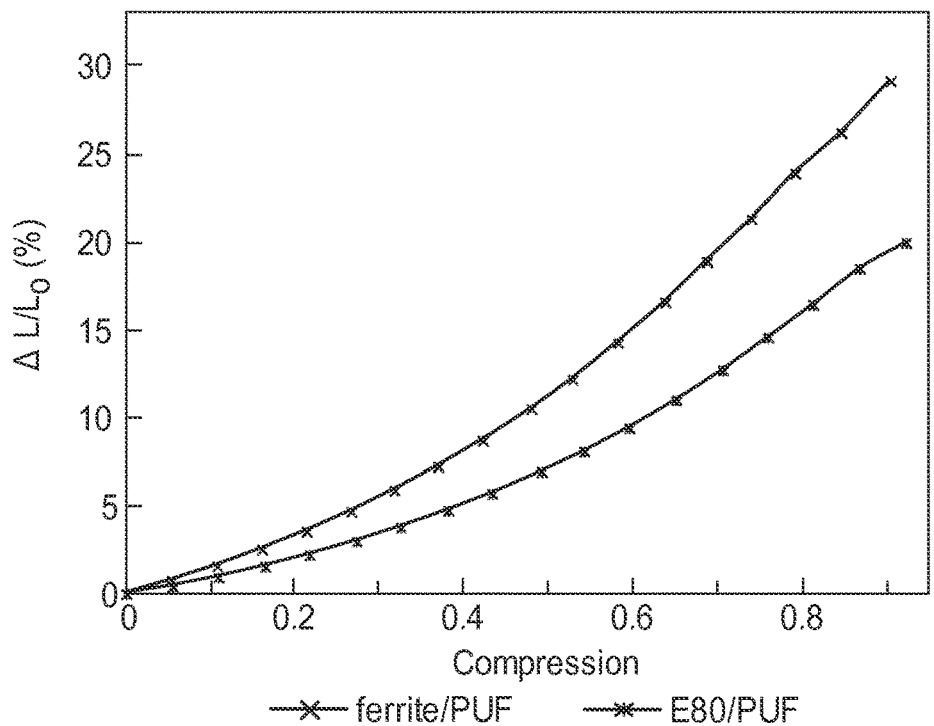
Figure 8C:
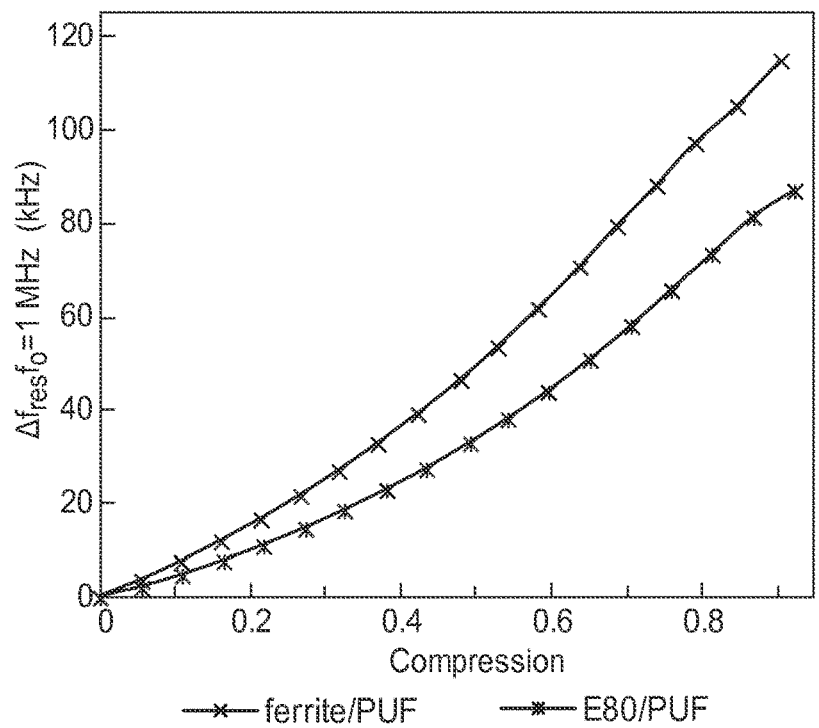
Figure 8D:
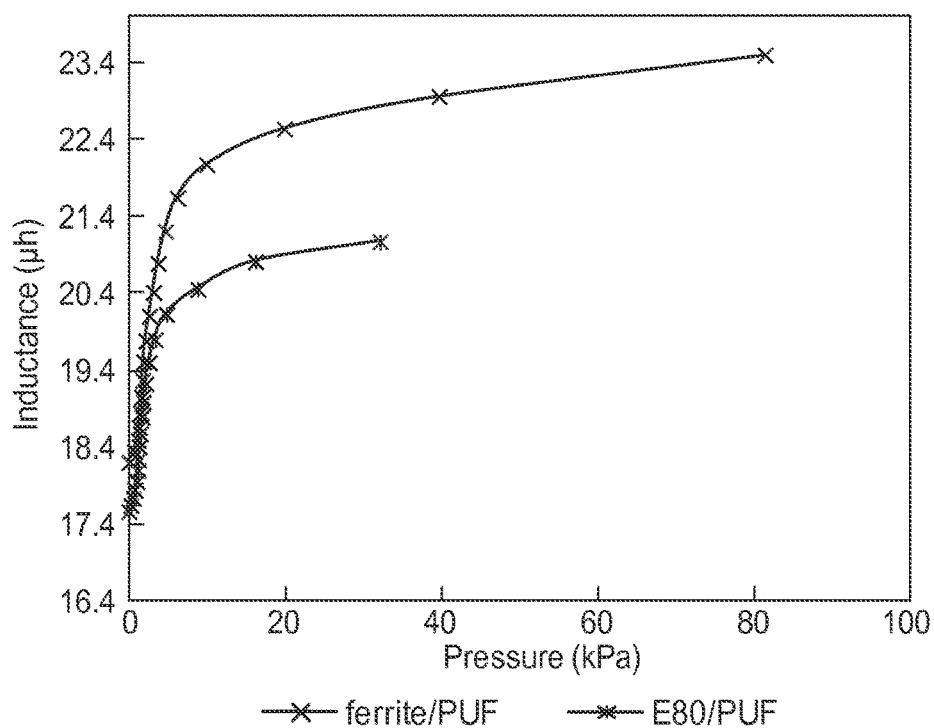
Figure 8E:
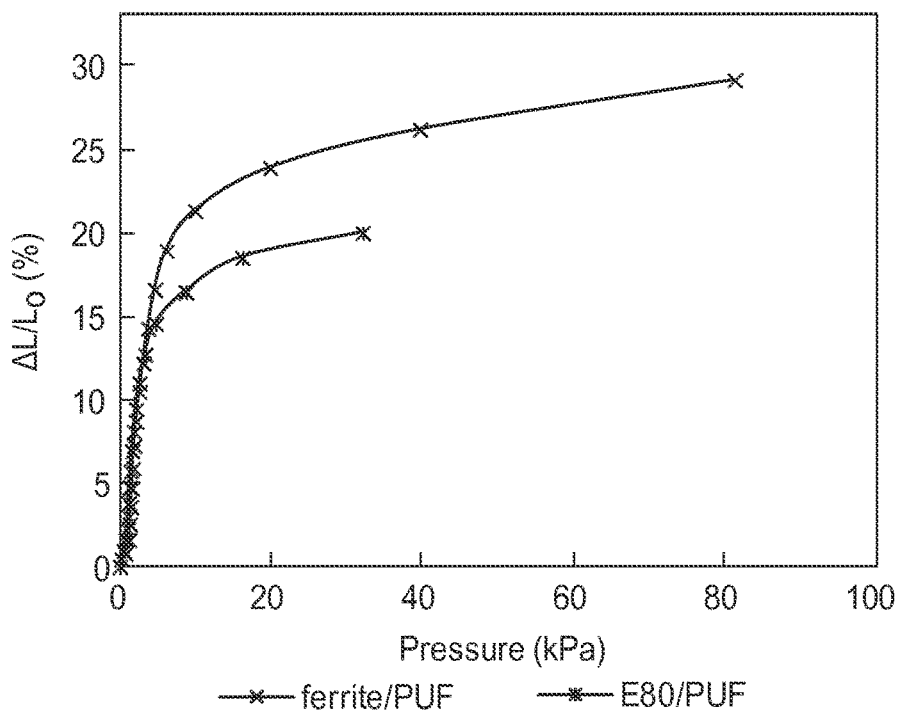
Figure 8F:
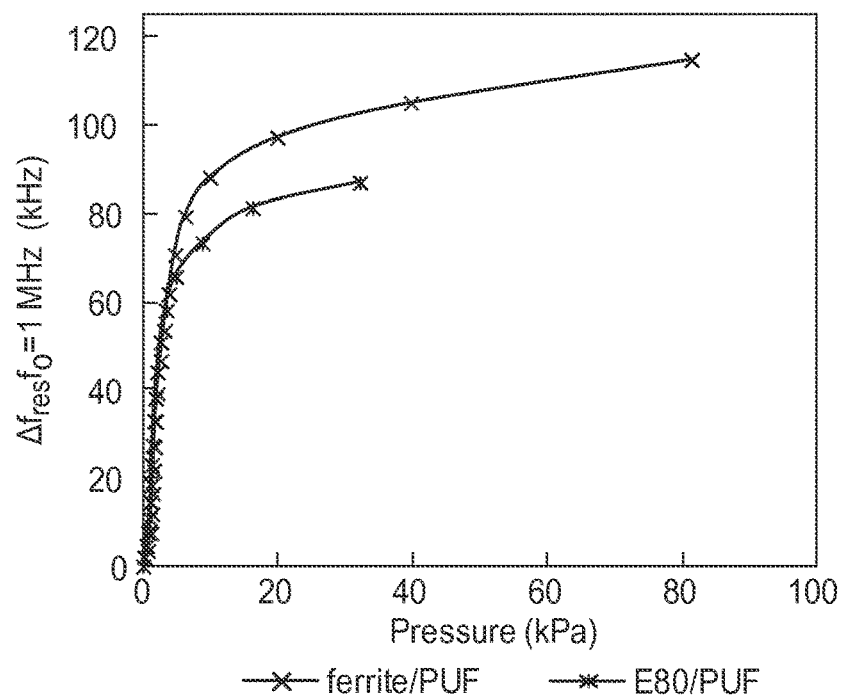

FIGS. 8A-8C (first example) and FIGS. 8D-8F are plots of the measured inductance, relative inductance change, and calculated resonant frequency shift (with a circuit capacitance of 152 nF) as a function of compressive strain and stress. As shown, FIGS. 8A-8F demonstrate the inductance, inductance change, and resonant frequency change of the sensor during the application of compressive strain and pressure.

In addition to the initial wired prototype experiments, example compression sensors in accordance with examples of the disclosure were fabricated as a demonstration for application to the 3M™ Coban 2 Compression System. The sensors were configured to be placed under the compression layer to provide remote monitoring of applied compression. The example force sensors were adhered to the outer surface of the first (inner) layer and the resonant frequency was wirelessly monitored during application of the second layer over the first layer. The resonant frequency was wirelessly monitored with a 3 turn loop antenna connected to a Rig-Expert AA-54 handheld impedance analyzer (available commercially from Rig Expert Ukraine Ltd, Kiev, Ukraine). The test results showed that the sensors were suitable for the demonstrated application, robust, and can be wirelessly monitored while mounted on the human body and wrapped within the compression wrap. The impedance analyzer remotely monitored and determined an inductance change during application of compression.

Figure 9:
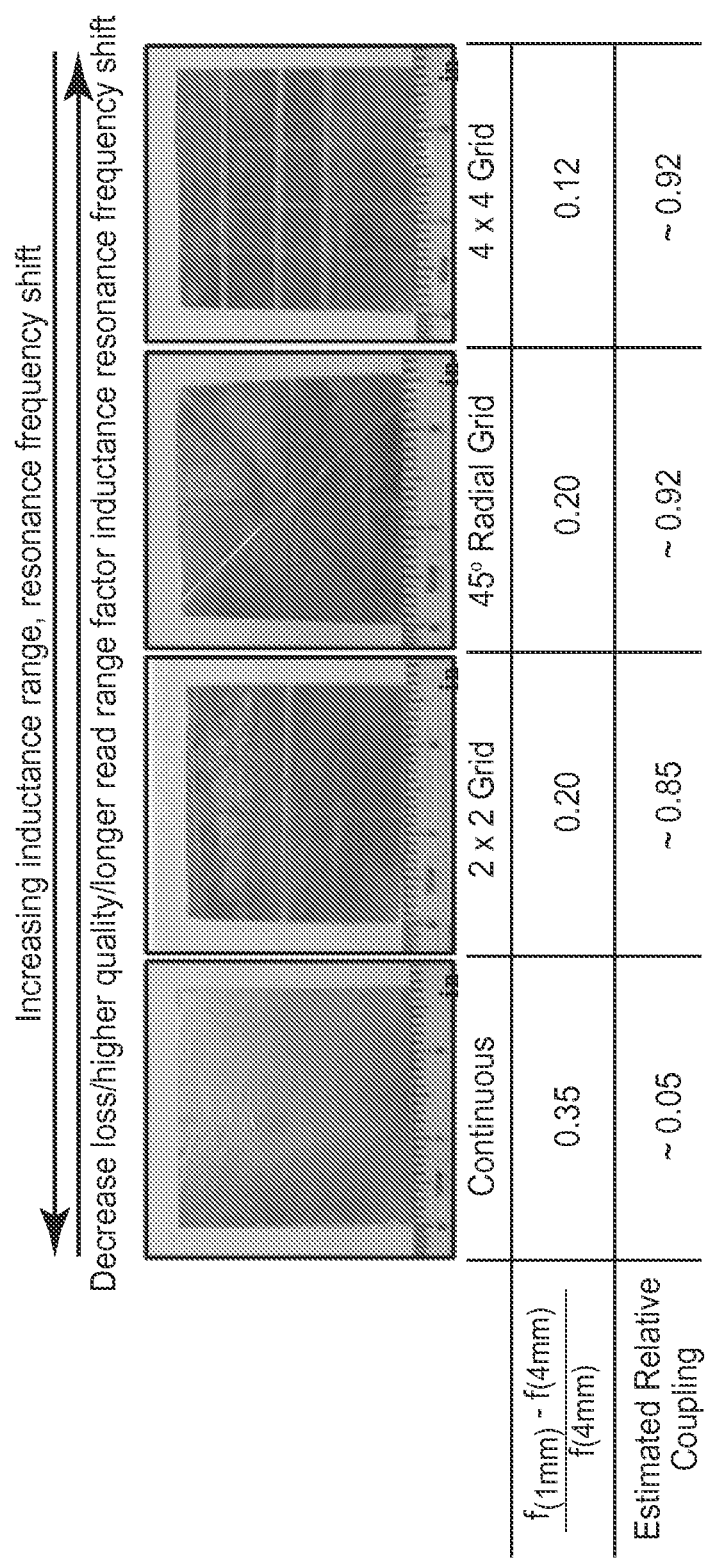
FIGS. 9-30 illustrate various aspects of experiments to evaluate some examples of the disclosure.

Additionally, a series of experiments were carried out to evaluate aspects of embodiments in which the reference layer of the force sensor is patterned (e.g., using a grid approach) compared to that of a substantially continuous layer. As described above, limits on the use of patterned references layer can be conceptualized as a continuous conductive layer and an infinitely segmented grid of conductive regions. The continuous conductive layer would result in the largest inductance change, but the largest energy loss and the infinitely segmented grid of conductive regions would results in the lowest inductance change but causing minimal loss. To evaluate this concept, sensitivity and relative loss of four sensors with differently patterned conductive copper layers were tested and modeled. FIG. 9 shows images of the experimentally tested sensors with different patterns of the conductive plane. In particular, FIG. 9 includes images of continuous and patterned conductive plane and experimental measurements of the relative resonance frequency shift of a LC resonance tag as the inductor-conductive layer separation distance changed from 4 mm to 1 mm. The estimated relative coupling between a 6.35×6.35 cm (2.5"×2.5") 3 turn loop antenna and the resonance tag at inductor-conductive plan separation of 1 mm (compared to 4 mm separation).

As demonstrated by the examples shown in FIG. 9, simple patterning of a conductive copper layer resulted in a large resonance frequency shift with only a small decrease in coupling. These results show that a patterned copper layer can be used in the envisioned sensor design to impart force sensitivity on an inductor or resonance frequency sensitivity on a LC circuit. Although not shown, the conductive layer can be designed to interact with only a fraction of the inductive layer, such as, e.g., quarter or half-size of the inductor layer. Although this approach lowers the magnitude of the inductance change, no patterning and less conductive material is required.

Figure 10:
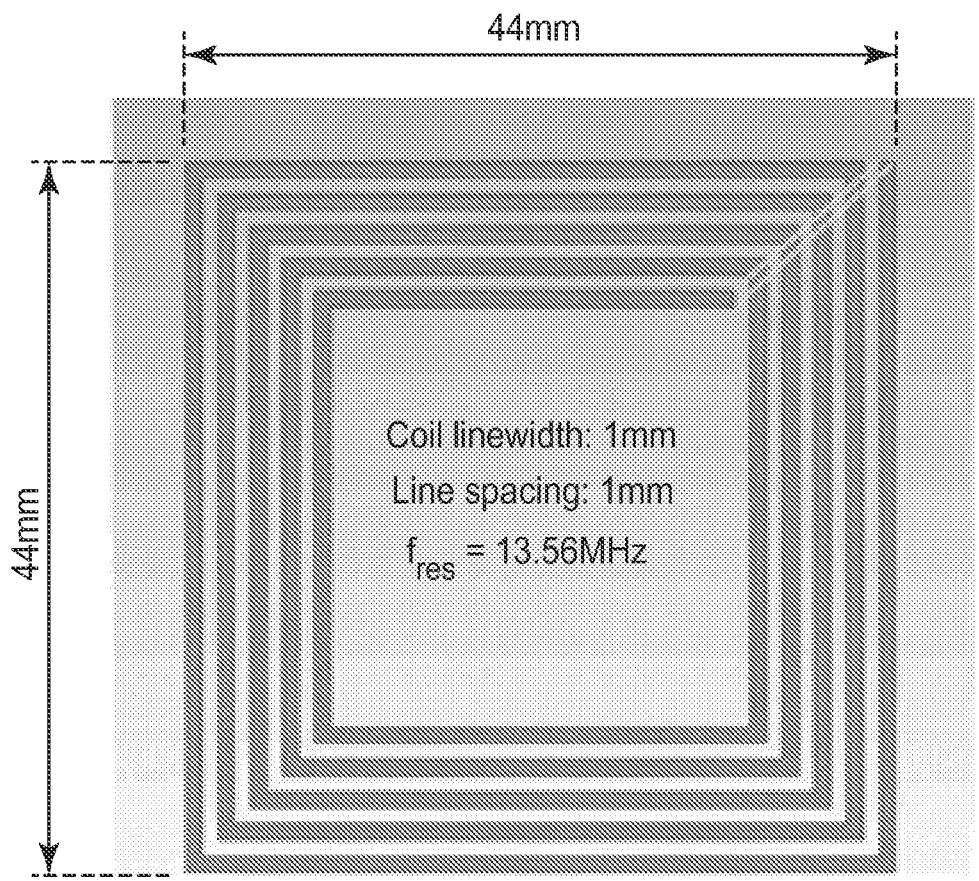
Figure 11:
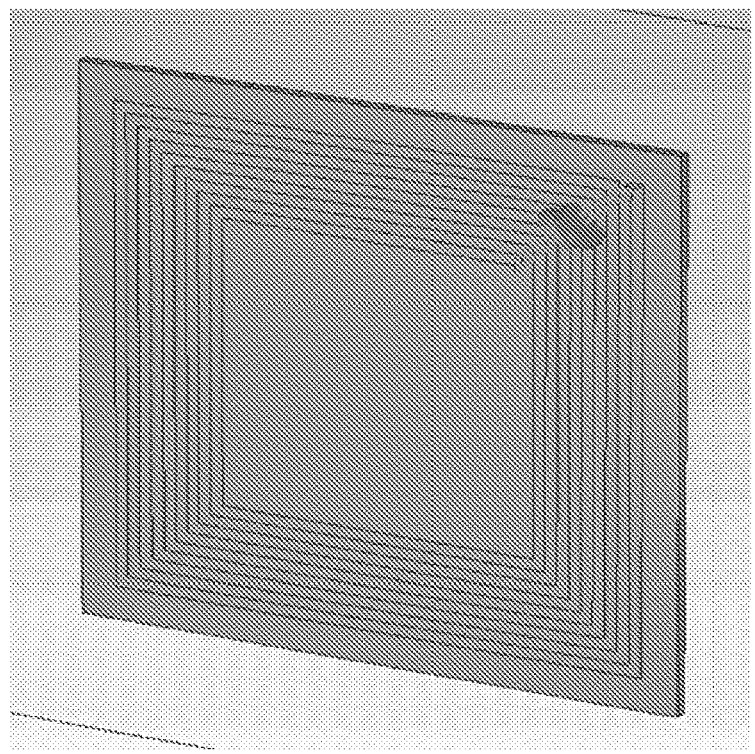
Figure 12:
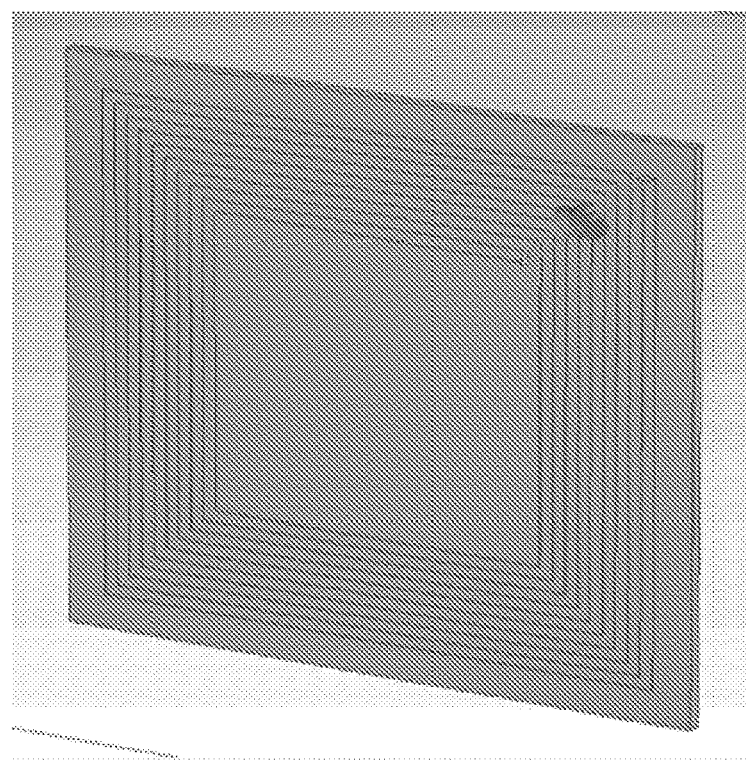
Figure 13:
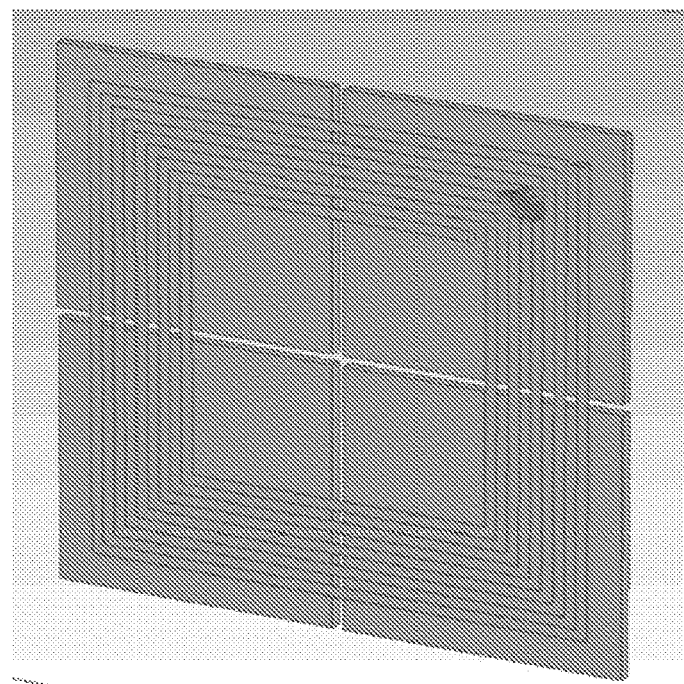
Figure 14:
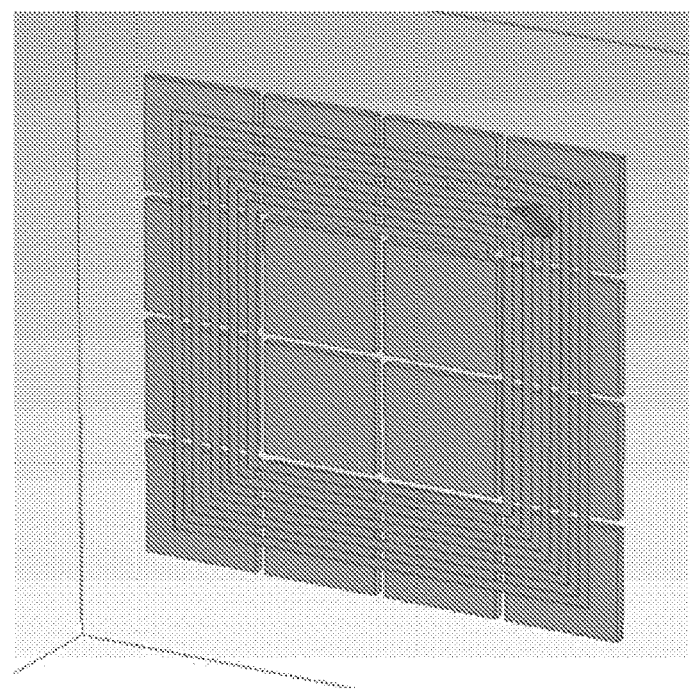
Figure 15:
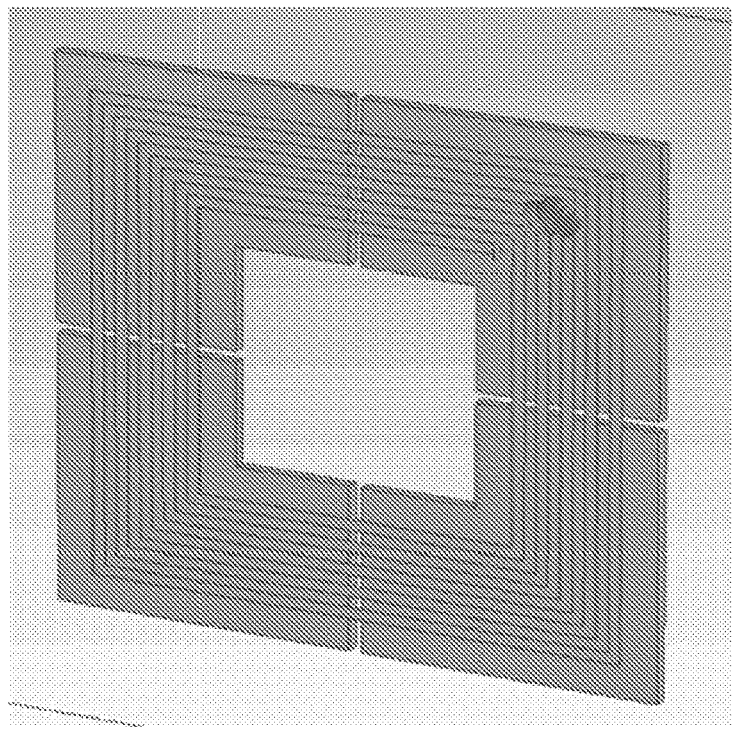
Figure 16:
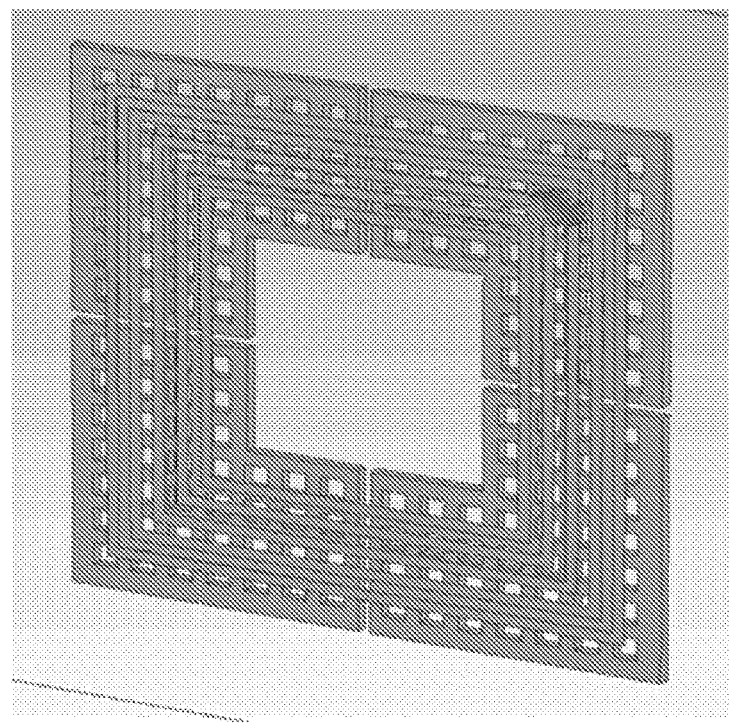
Figure 17:
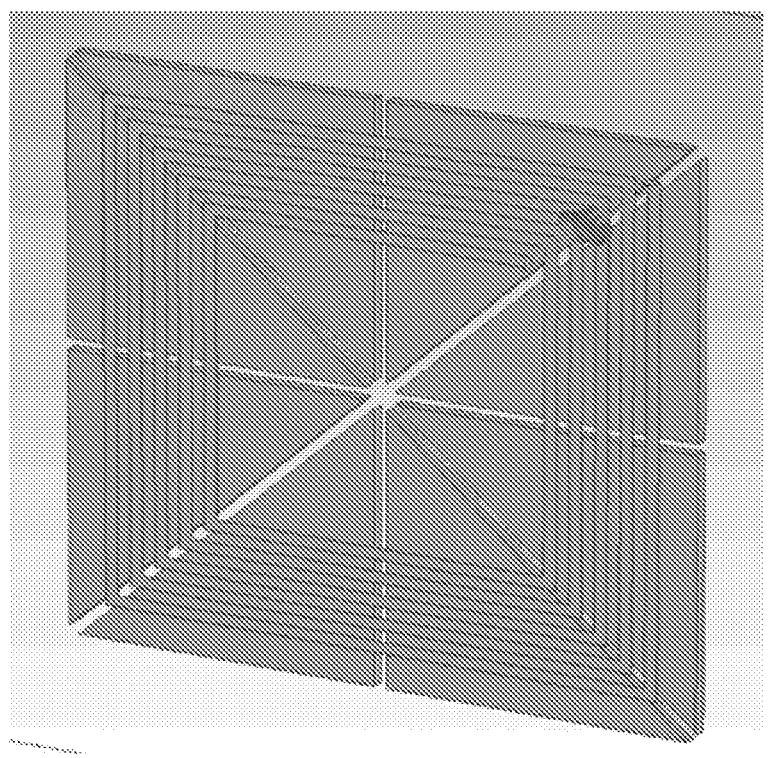
Figure 18A:
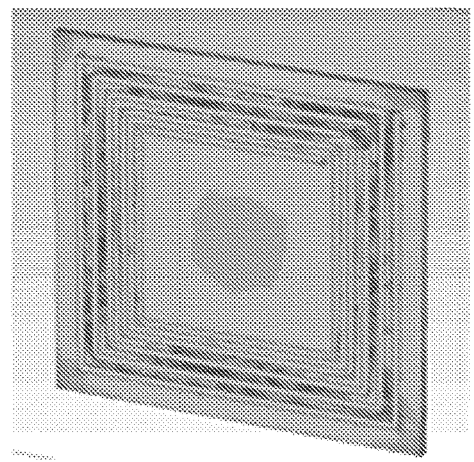
Figure 18B:
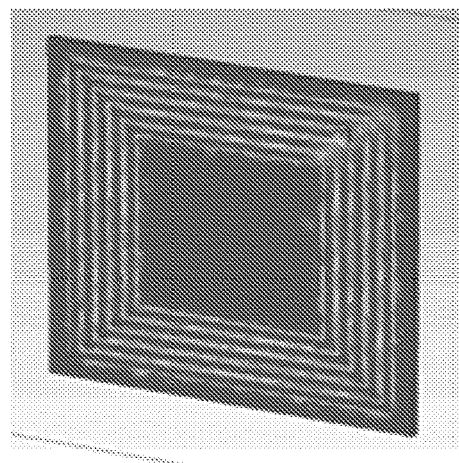
Figure 18C:
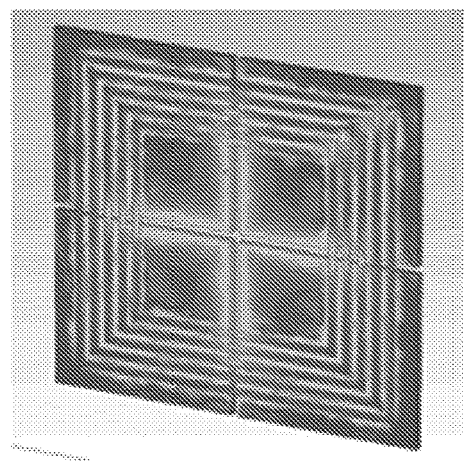
Figure 18D:
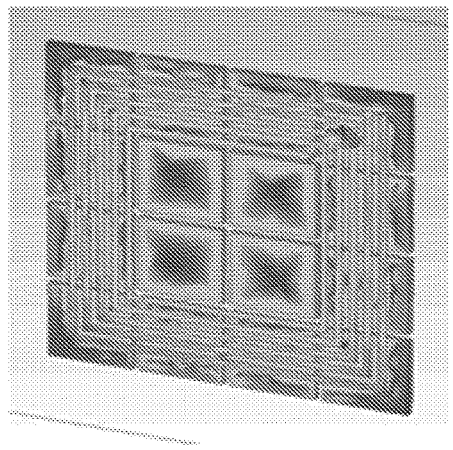
Figure 18E:
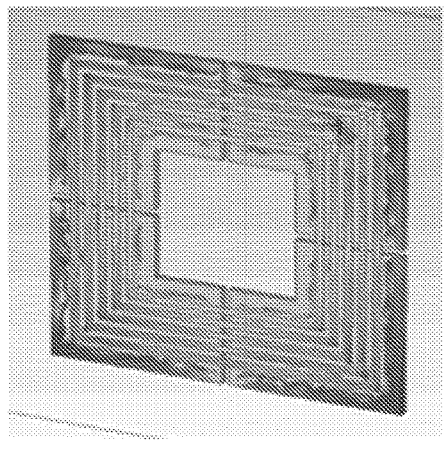
Figure 18F:
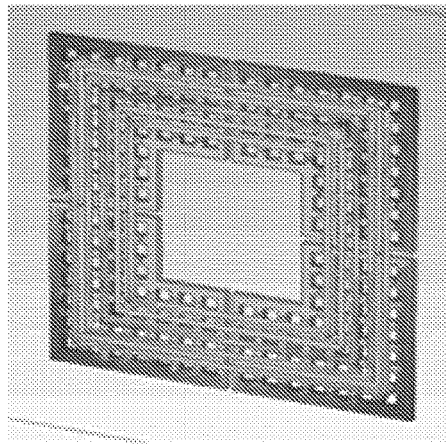
Figure 18G:
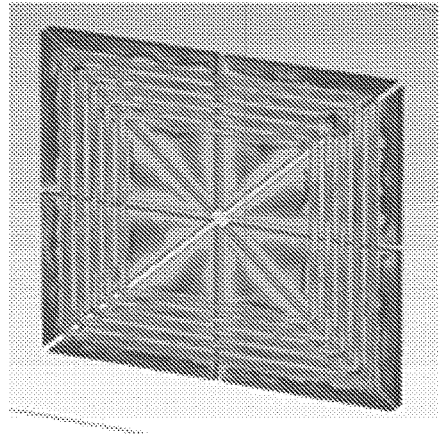

To further evaluate the use of patterned layers, finite element modeling (using CST Microwave Studio 2013) was employed to model a LC resonance tag at 13.56 MHz with various metal patterns. FIG. 10 illustrates the dimensions and other properties used for modeling the various patterns. The size of conductive sheet was 50 mm×50 mm and the thickness was 1 mm. The grid width was 1 mm. FIGS. 11-17 illustrate the different example patterns modeled for evaluation. The modeling was used to: generate magnetic field distribution plots to see how to manipulate the induced eddy currents by designing conductive patterns; analyze sensitivity for the various conductive patterns; analyze grid width versus resonant frequency; analyze alignment error versus resonant frequency; analyze conductivity versus sensitivity; analyze size of conductive sheet versus sensitivity; and analyze conductivity-gradient patters versus sensitivity FIGS. 18A-18G are magnetic field distribution plots at 13.56 MHz for the various models showing how induced eddy currents may be manipulated by designing conductive patterns. FIG. 18A was a magnetic sheet, FIG. 18B was a conductive sheet, FIG. 18C was a 2×2 grid conductive sheet, FIG. 18D was a 4×4 grid conductive sheet, FIG. 18E was a modified 2×2 grid conductive sheet #1, FIG. 18F was a modified 2×2 grid conductive sheet #2, and (g) FIG. 18G was a 45° radical grid conductive sheet.

In the case of magnetic sheet (FIG. 18A), the magnetic field strength was as good as LC resonance circuits in air and also, the coil inductance increases by locating high permeability magnetic sheet closer to RFID. In the case of conductive sheet (FIG. 18B), most of magnetic fields are cancelled because of induced eddy currents on metallic sheet. In the case of various patterns on conductive sheet (FIGS. 18C-18G), the magnitude and direction of the induced eddy currents in conductive sheet can be manipulated by simply cutting conductive sheet. FIGS. 18C-18G also show how to reduce eddy currents by patterning. For the modeling, the conductivity of conductive sheet was set to $5.8 \times 10^7$ S/m.

Analysis of sensitivity for the various conductive patterns was also performed to show that the sensitivity and resonant frequency shift range of LC resonance circuits can be customized by patterning conductive sheet properly. The results in Table 1 below illustrate how the resonant frequency changes by increasing the spacing between LC resonance circuits and conductive sheet from 0 mm to 12 mm by 2 mm step. Based on the results, there appeared to be relationship between sensitivity and loss. By suppressing more eddy current, lower loss may be obtained, but the sensitivity decreased.

TABLE 1

| Spacing | (a) | (b) | (c) | (d) | (g) |
| --- | --- | --- | --- | --- | --- |
| 0 mm | 10.478 | 57 | 23.111 | 16.606 | 17.88 |
| 2 mm | 11.7 | 21.282 | 17.5 | 15.502 | 15.966 |
| 4 mm | 12.438 | 17.641 | 15.915 | 14.876 | 15.094 |
| 6 mm | 12.9 | 16.154 | 15.128 | 14.563 | 14.667 |
| 8 mm | 13.147 | 15.368 | 14.667 | 14.349 | 14.359 |
| 10 mm | 13.36 | 14.803 | 14.427 | 14.152 | 14.188 |
| 12 mm | 13.48 | 14.581 | 14.222 | 14.036 | 14.1 |

Figure 19:
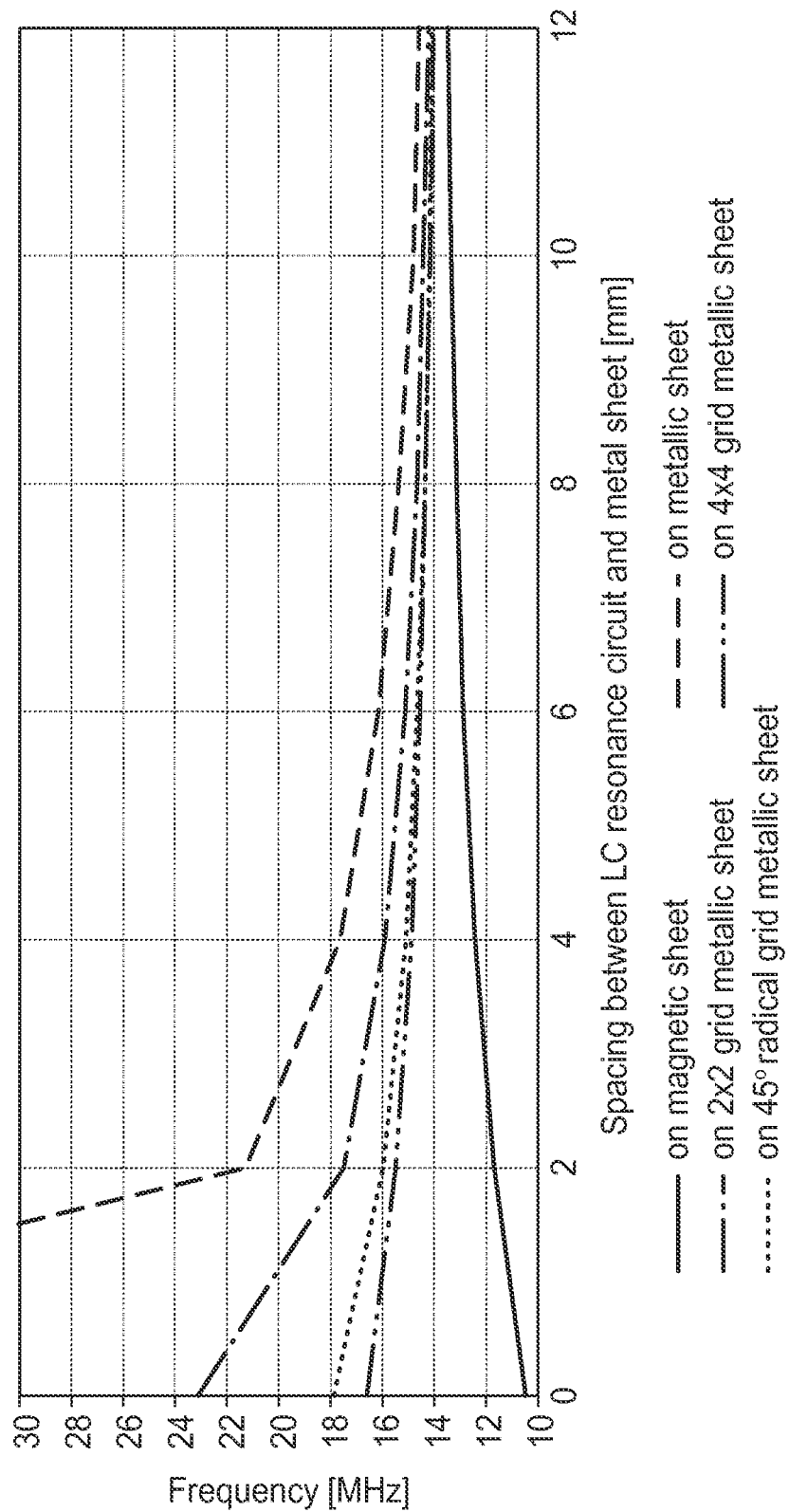

FIG. 19 is a plot of resonant frequency change versus spacing between LC resonance circuit and conductive sheet for the various patterns. As shown, it was found that the type and geometry of the reference layer affected the resonant frequency change and direction.

Figure 20:
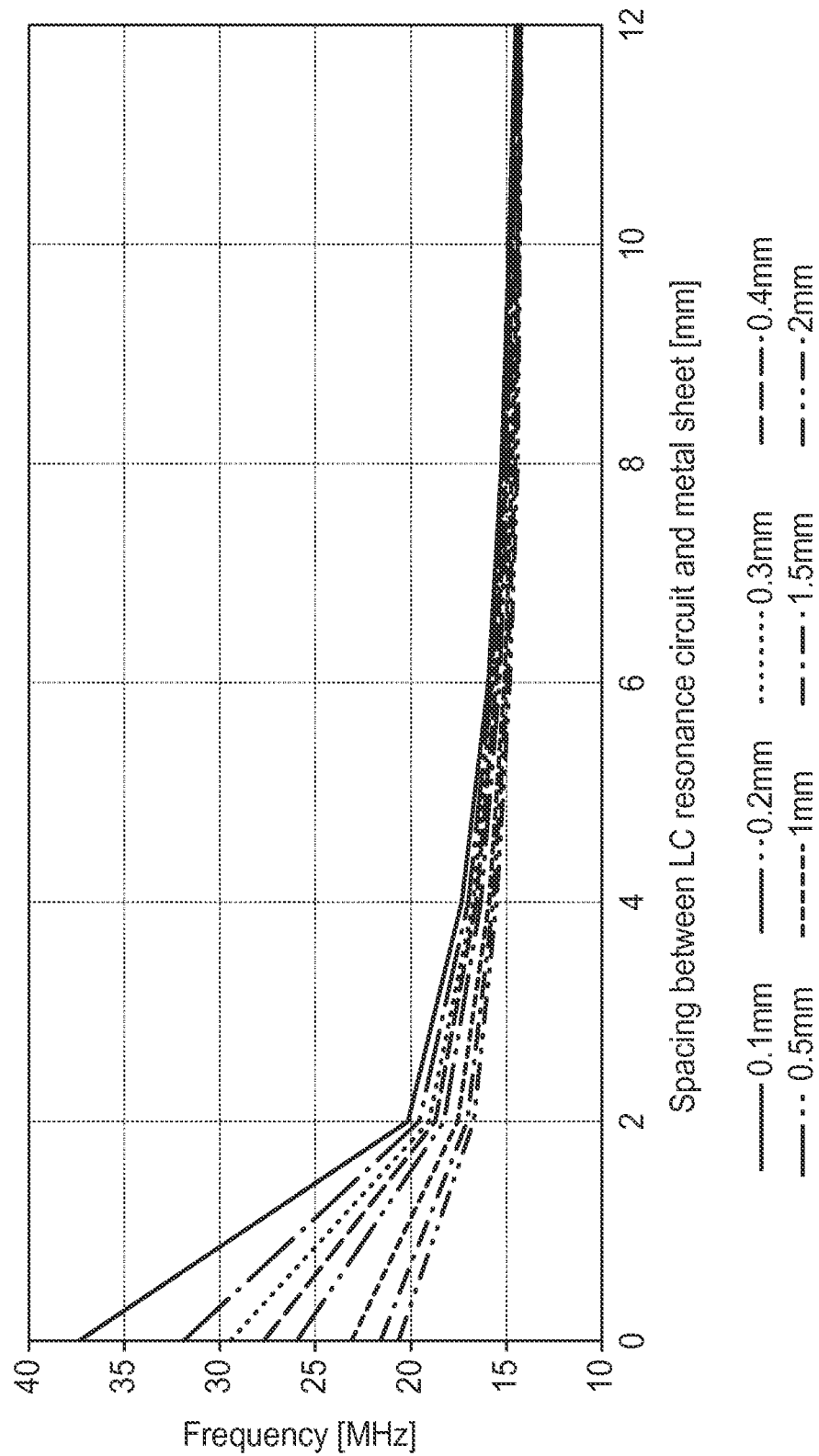

Analysis of grid width versus resonant frequency for the various conductive patterns was also performed. In particular, LC resonance circuits on 4×4 grid conductive sheet were used to obtain the correlation between grid width and resonant frequency shift. Table 2 below summarized the results and FIG. 20 is a plot of grid width versus resonant frequency shift. As shown, it was found that as the grid width increases from 0.1 mm to 2 mm, the change of resonant frequency and loss decreased.

TABLE 2

| Spacing | 0.1 mm | 0.2 mm | 0.3 mm | 0.4 mm | 0.5 mm | 1 mm | 1.5 mm | 2 mm |
|---|---|---|---|---|---|---|---|---|
| 0 mm | 37.356 | 31.895 | 29.448 | 27.694 | 25.959 | 23.092 | 21.572 | 20.656 |
| 2 mm | 20.157 | 19.563 | 19.044 | 18.724 | 18.273 | 17.547 | 17.047 | 16.707 |
| 4 mm | 17.339 | 16.993 | 16.722 | 16.573 | 16.339 | 15.907 | 15.699 | 15.509 |
| 6 mm | 15.944 | 15.787 | 15.739 | 15.547 | 15.371 | 15.112 | 14.957 | 14.819 |
| 8 mm | 15.259 | 15.195 | 15.07 | 15.019 | 14.905 | 14.698 | 14.542 | 14.404 |
| 10 mm | 14.862 | 14.803 | 14.734 | 14.683 | 14.542 | 14.404 | 14.35 | 14.3 |
| 12 mm | 14.531 | 14.465 | 14.441 | 14.441 | 14.301 | 14.27 | 14.24 | 14.212 |

Figure 21:
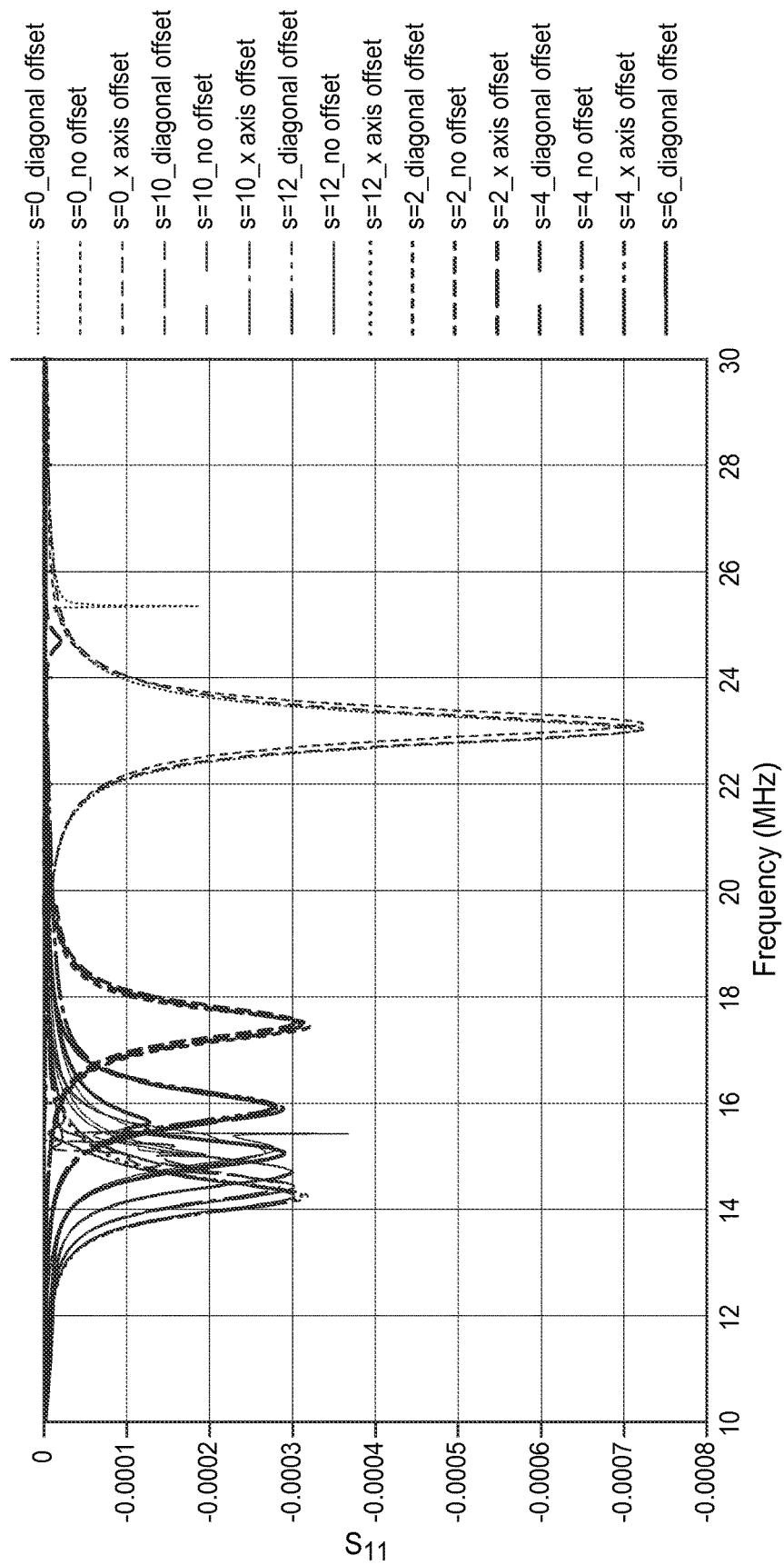
Figure 22:
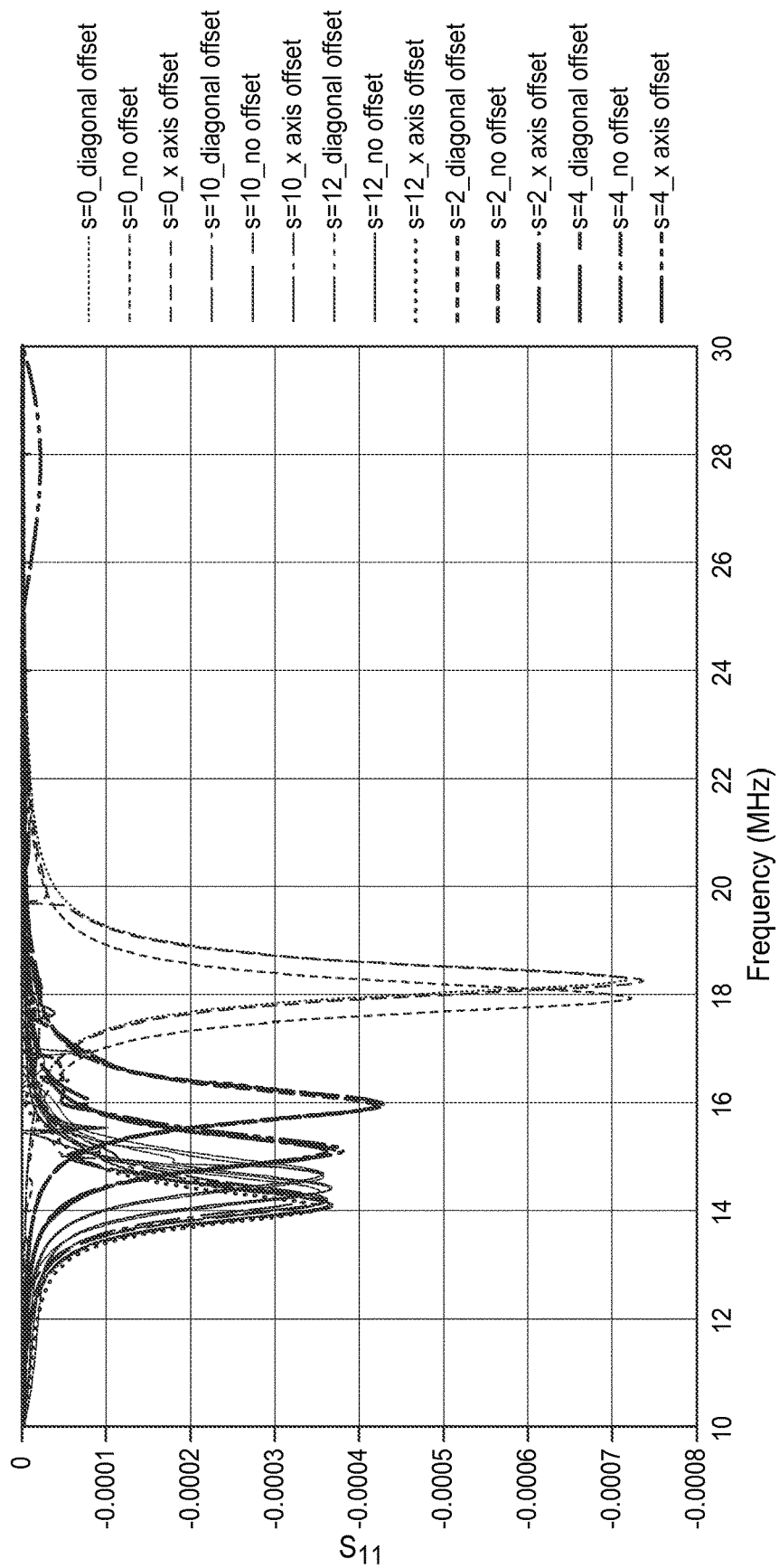

Analysis of alignment versus resonant frequency for the various conductive patterns was also performed, e.g., as a consideration for product manufacturing. For the modeling, an approximately 5% model error was assumed with offsets of 2.5 mm deviation on X-axis and 2.5 mm deviation on X- and Y-axis. FIG. 21 is a plot of frequency versus reflection coefficient ($S_{11}$) from the modeling of a LC resonance circuit on a 4×4 metallic sheet to evaluate alignment error versus resonant frequency. FIG. 22 is a plot of frequency versus reflection coefficient ($S_{11}$) from the modeling for RFID on 45° radical grid metallic sheet to evaluate alignment error versus resonant frequency. It was determined from the modeling results, that an approximately 5% alignment error can be tolerated for the manufacturing cost reduction.

Figure 23A:
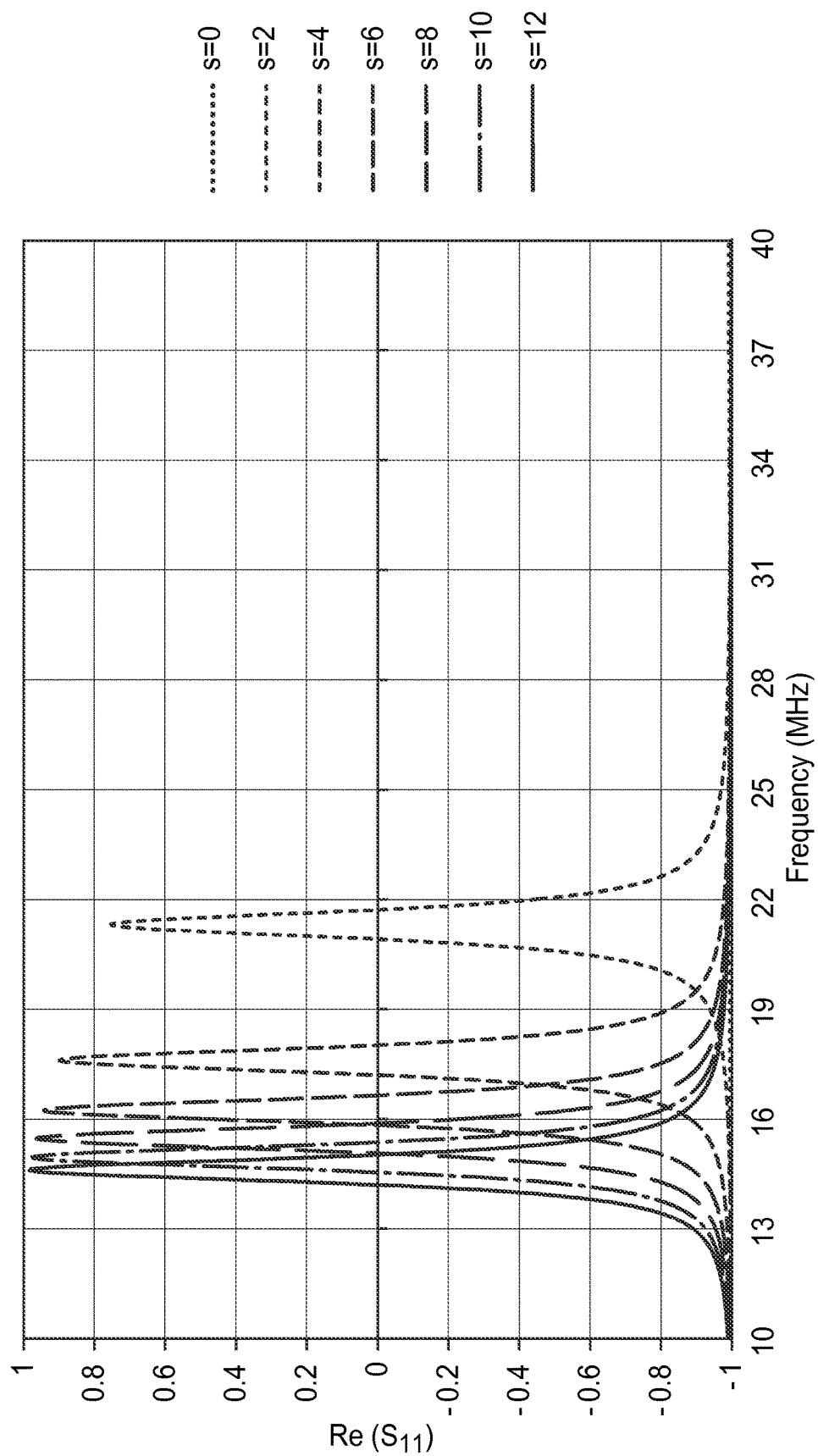
Figure 23B:
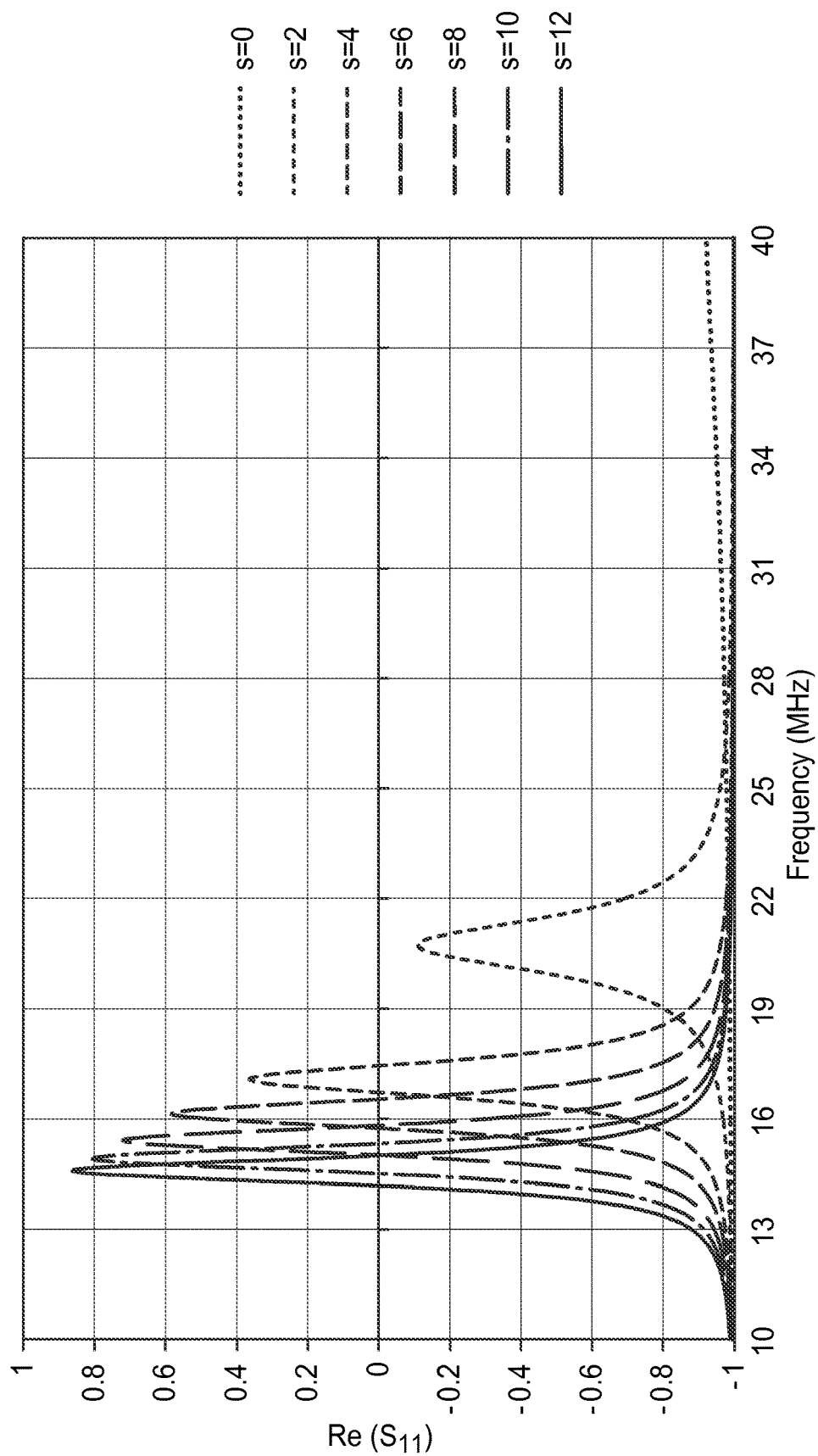
Figure 23C:
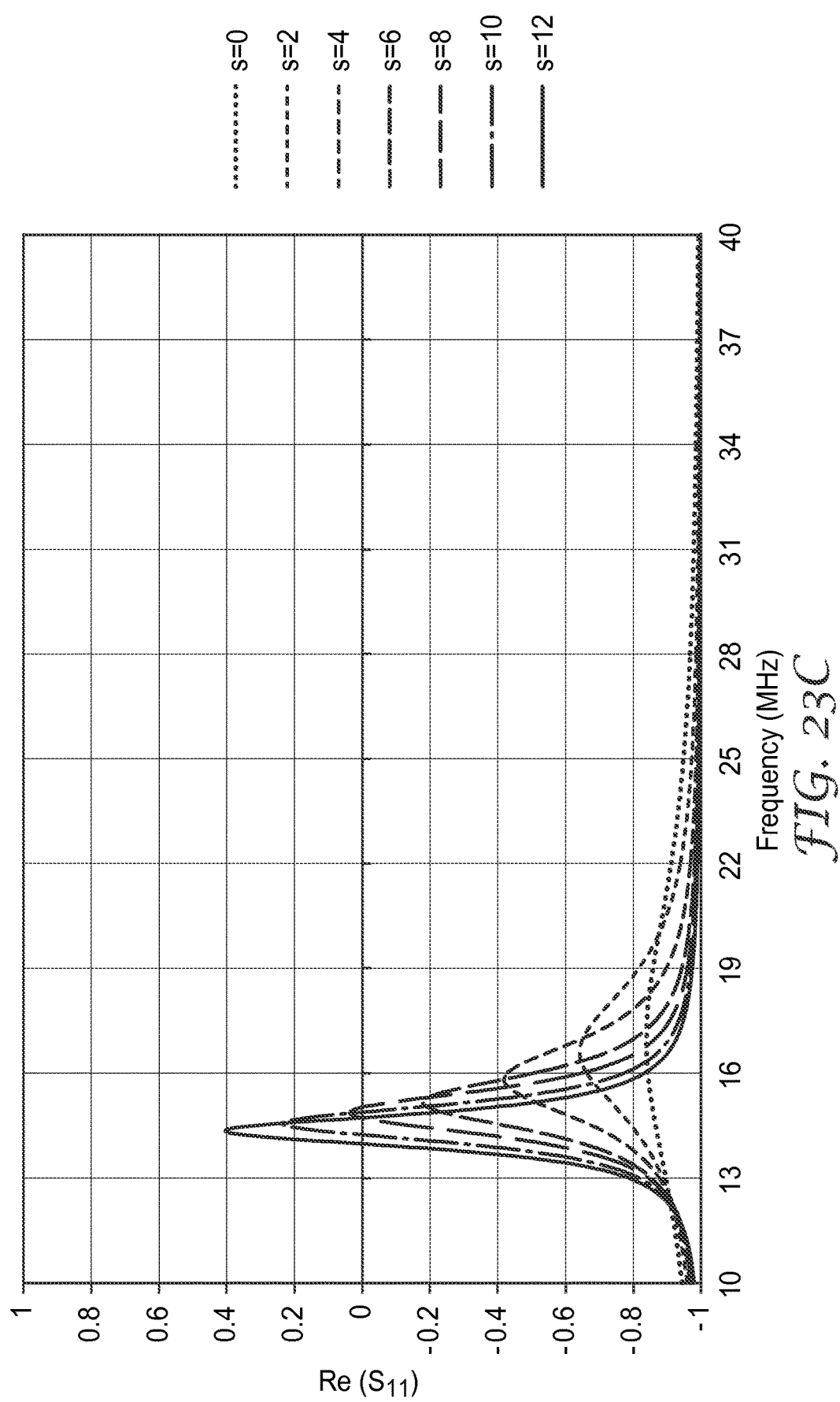
Figure 23D:
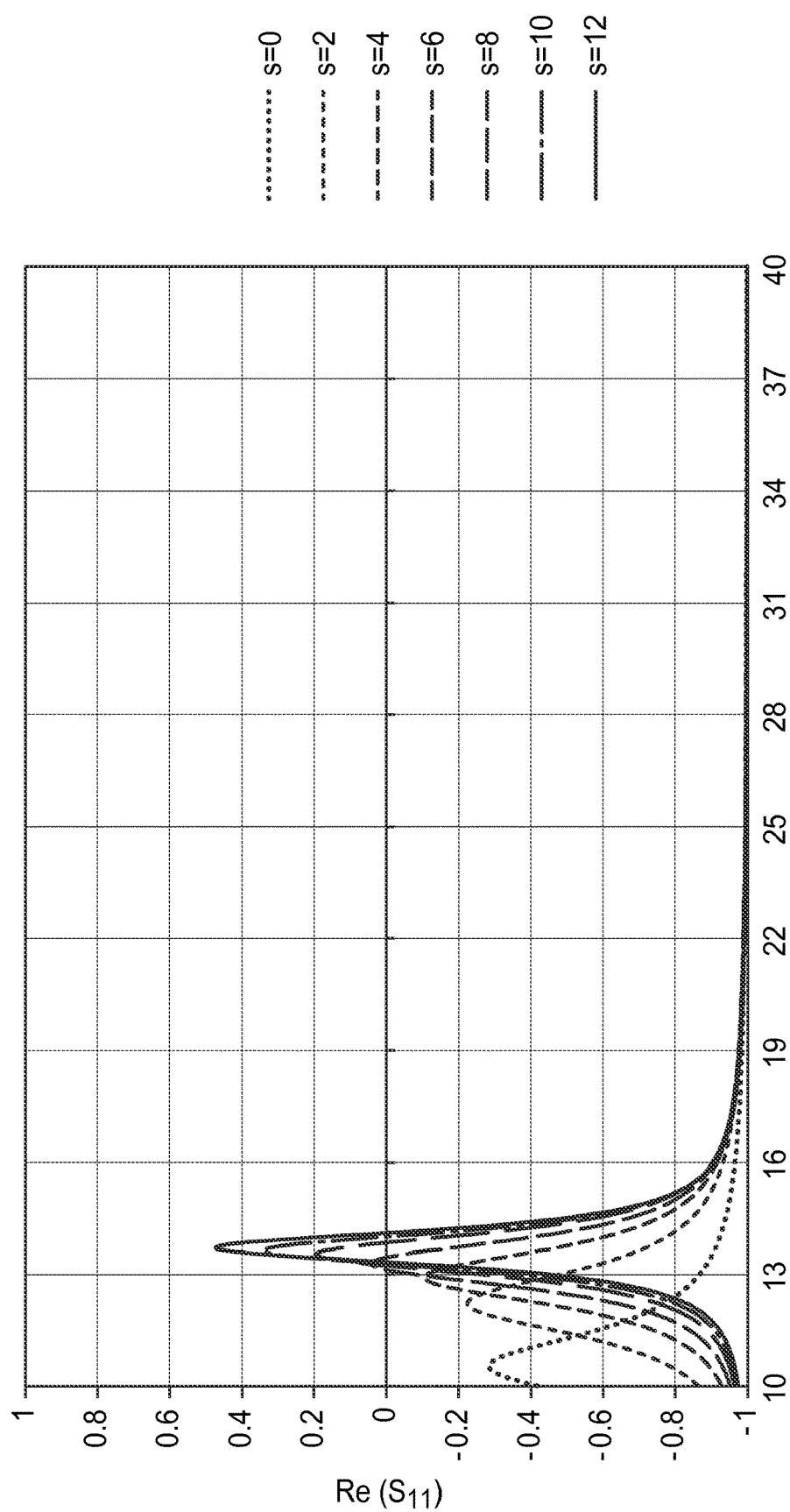

Analysis of conductivity versus sensitivity was performed by modeling a conductive sheet with a conductivity of $10^n$ S/m, where n was swept from n=1 to n=7. FIG. 23A is a plot of the results for n=7. FIG. 23B is a plot of the results for n=5. FIG. 23C is a plot of the results for n=3. FIG. 23D is a plot of the results for n=1. FIGS. 23A-23D are plotted in terms of frequency versus the real part of reflection coefficient ($Re(S_{11})$). The results may be useful in designing sensors for application types by considering the target cost and sensitivity requirement.

Figure 24:
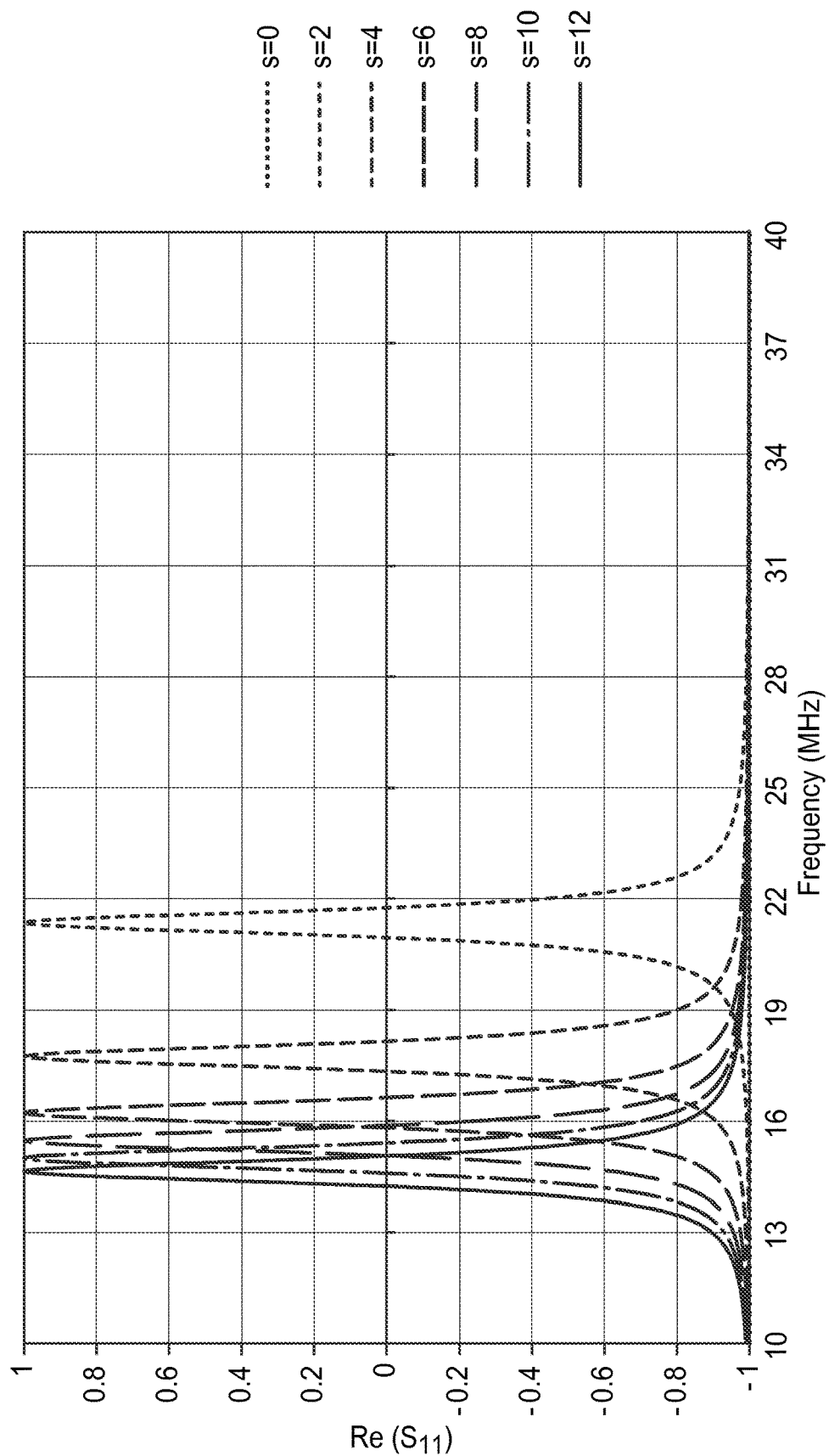
Figure 25:
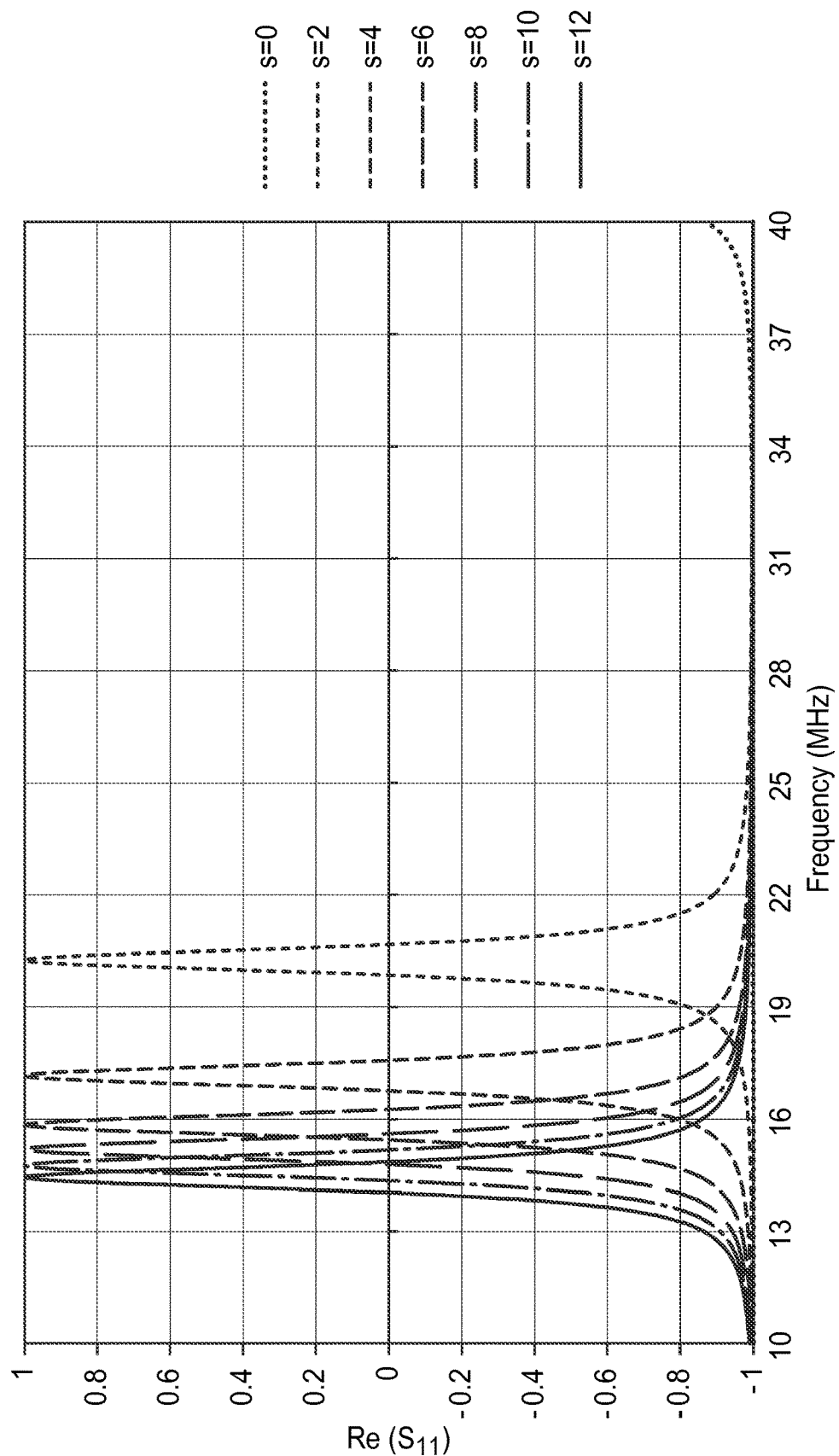
Figure 26:
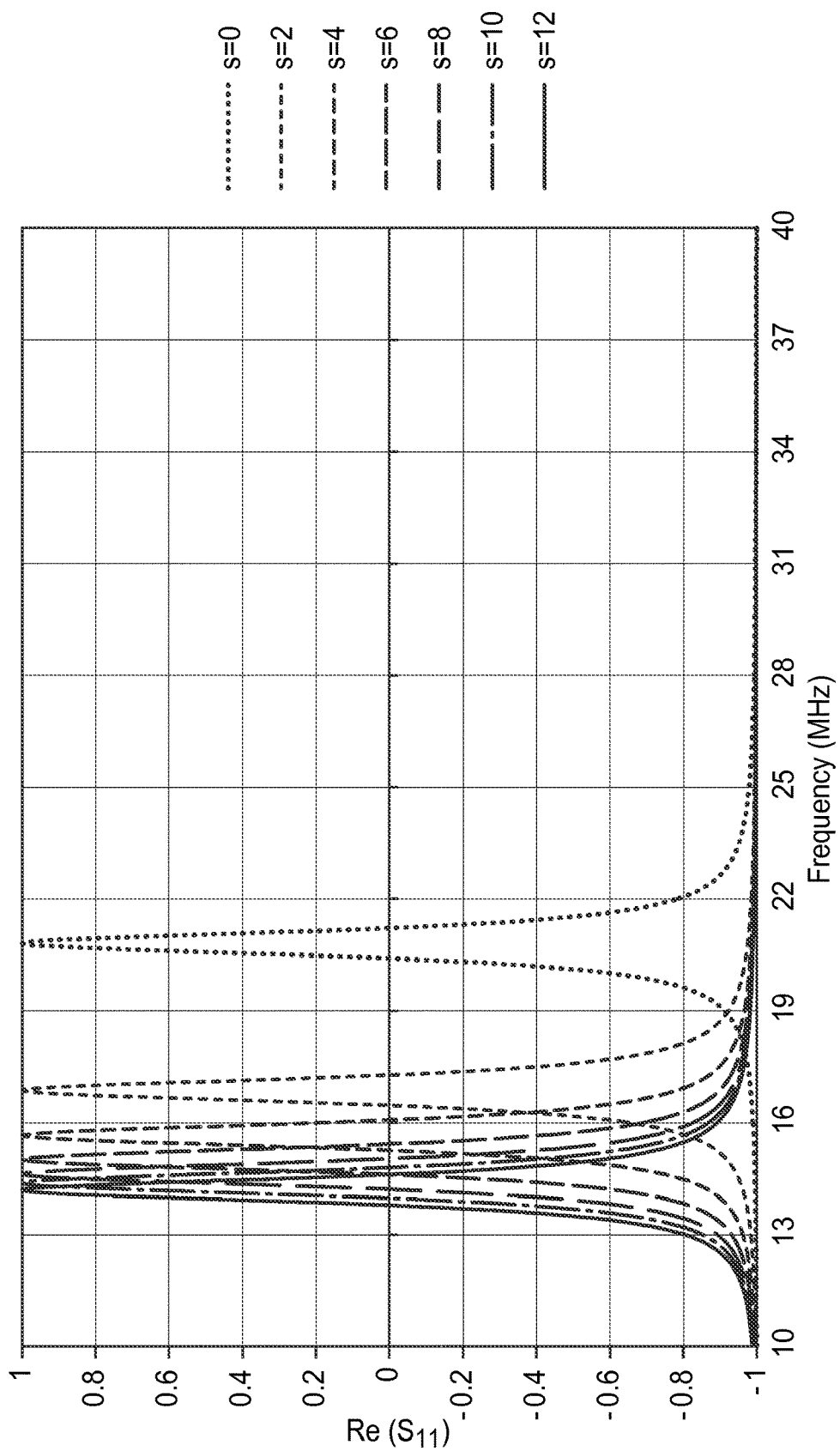
Figure 27:
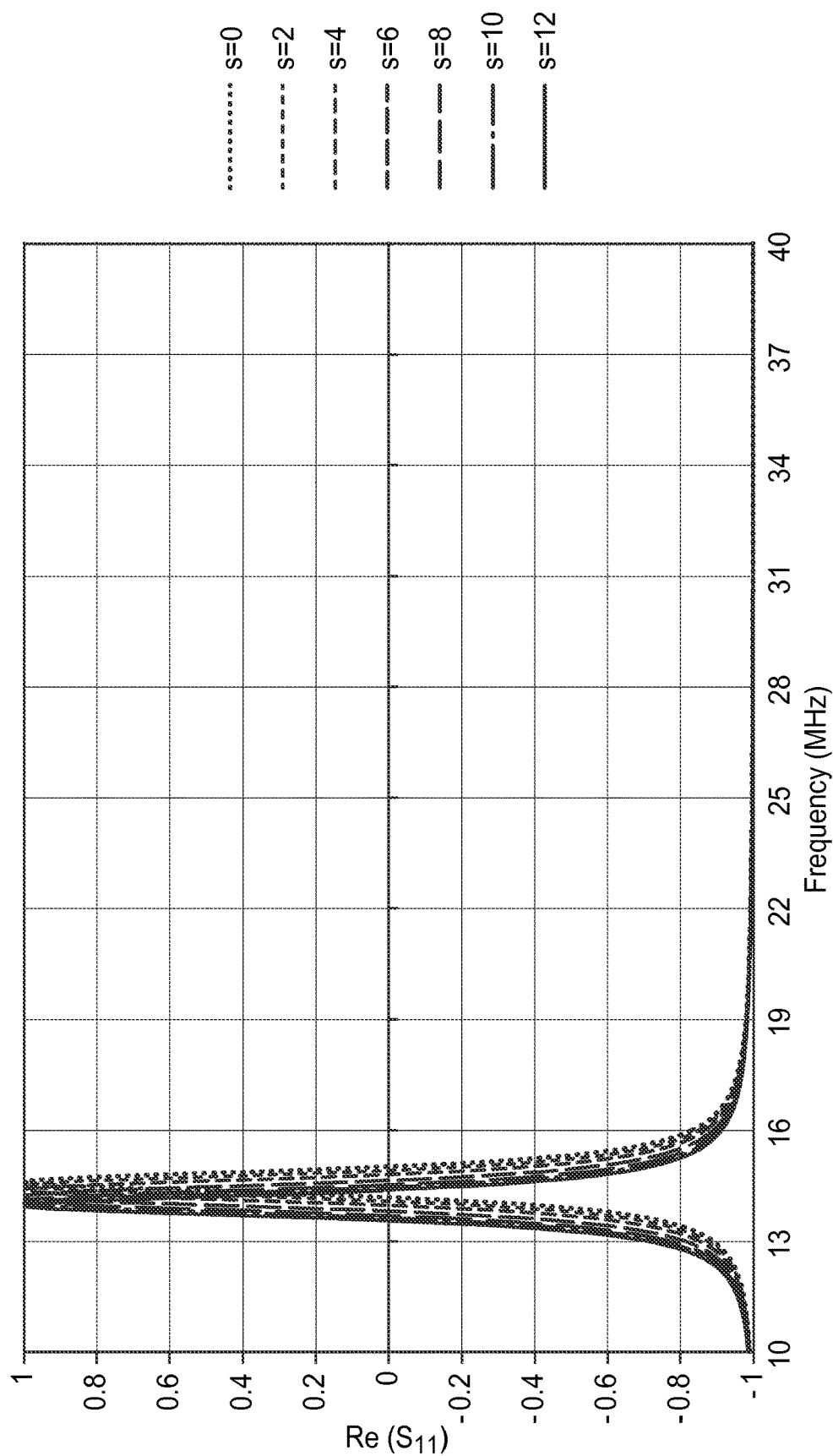
Figure 28:
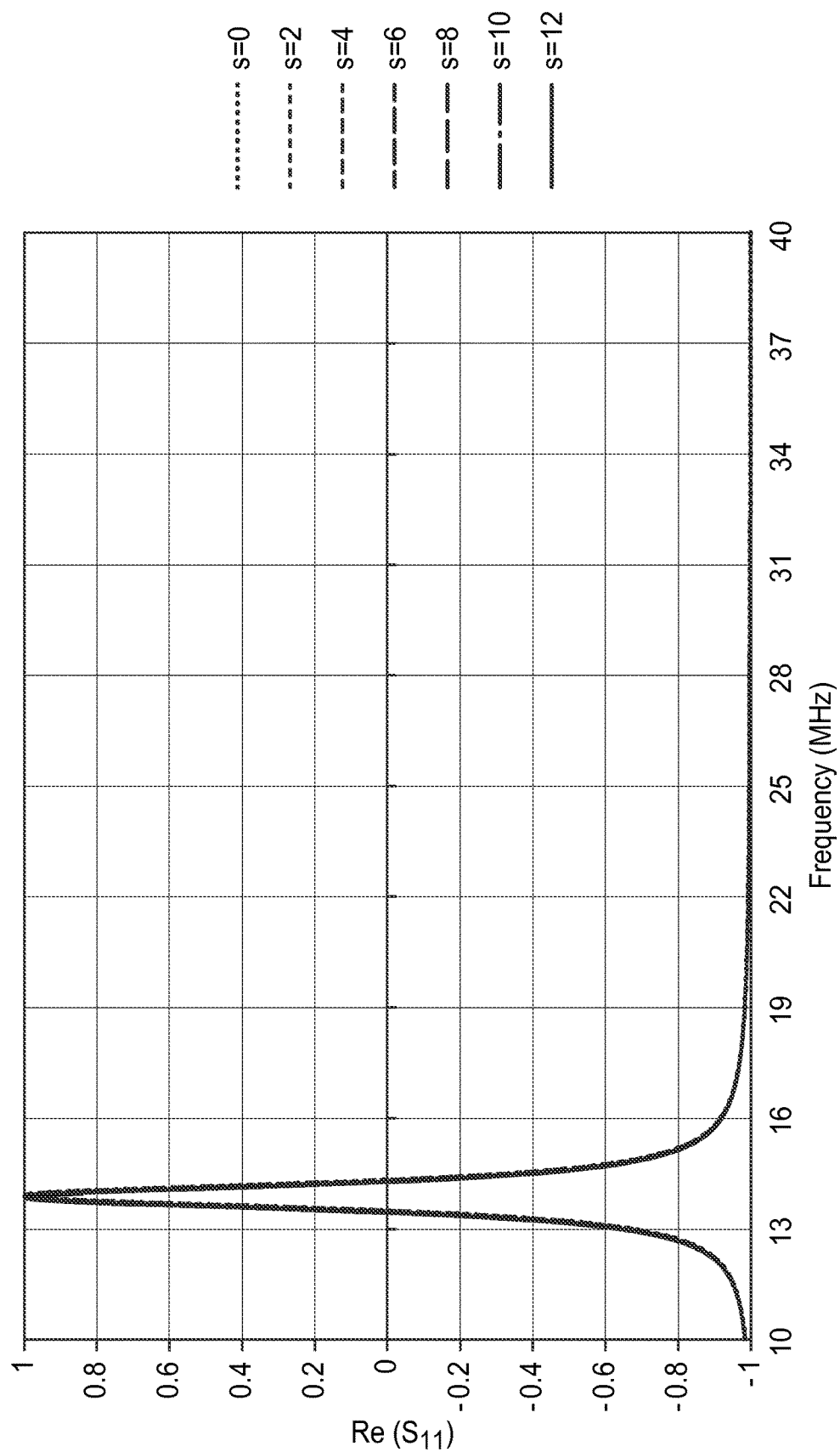

Analysis of the size of the conductive sheet versus sensitivity was performed to determine whether sensitivity could be customized by changing the size of conductive sheet. In the modeling, the size of a square conductive sheet (L×L) ranged from 10 mm×10 mm to 50 mm×50 mm. FIG. 24 is a plot of the results for L=50 mm. FIG. 25 is a plot of the results for L=40 mm. FIG. 26 is a plot of the results for L=30 mm. FIG. 27 is a plot of the results for L=20 mm. FIG. 28 is a plot of the results for L=10 mm. FIGS. 24-28 are plotted in terms of frequency versus the real part of reflection coefficient ($Re(S_{11})$). The results indicated that sensitivity may be customized by changing the size of conductive sheet.

The influence of conductive-gradient patterns on sensitivity was evaluated. Two example 50 mm×50 mm conductive sheets with differing conductive-gradient patterns were modeled. Each example was composed of three portions; a first portion having a conductivity of $10^2$ S/m, a second portion having a conductivity of $10^4$ S/m, and a third portion having a conductivity of $10^6$ S/m.

Figure 29A:
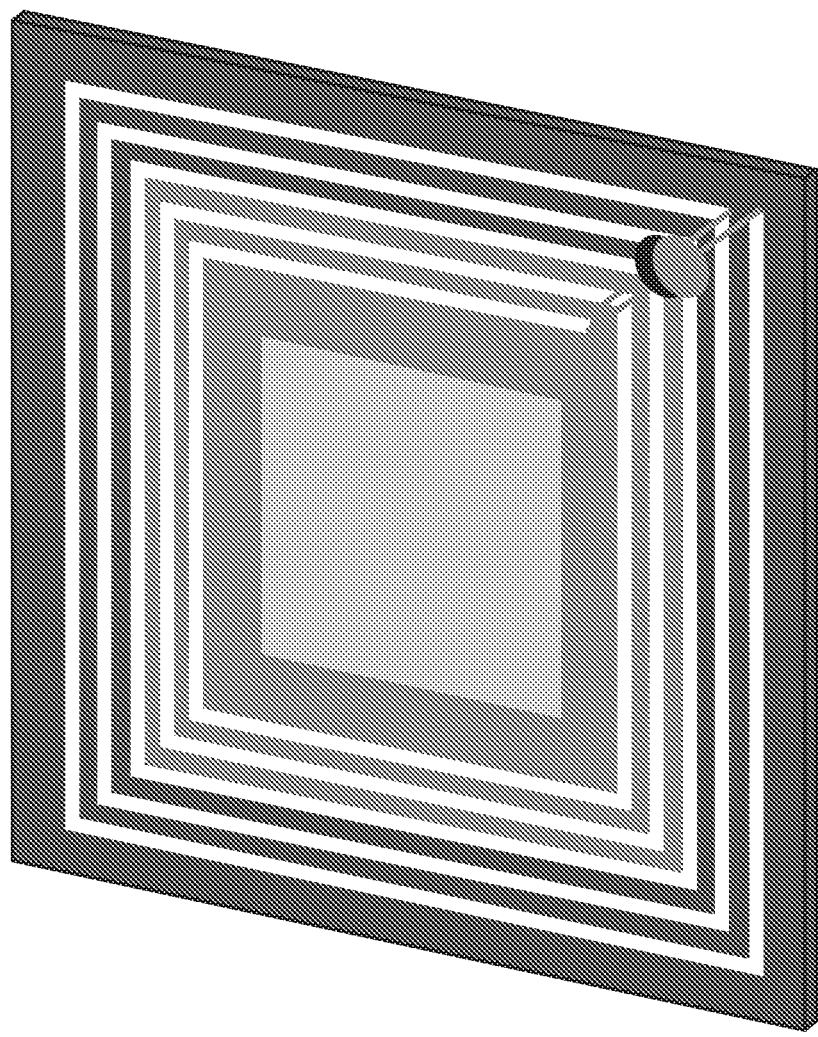
Figure 29B:
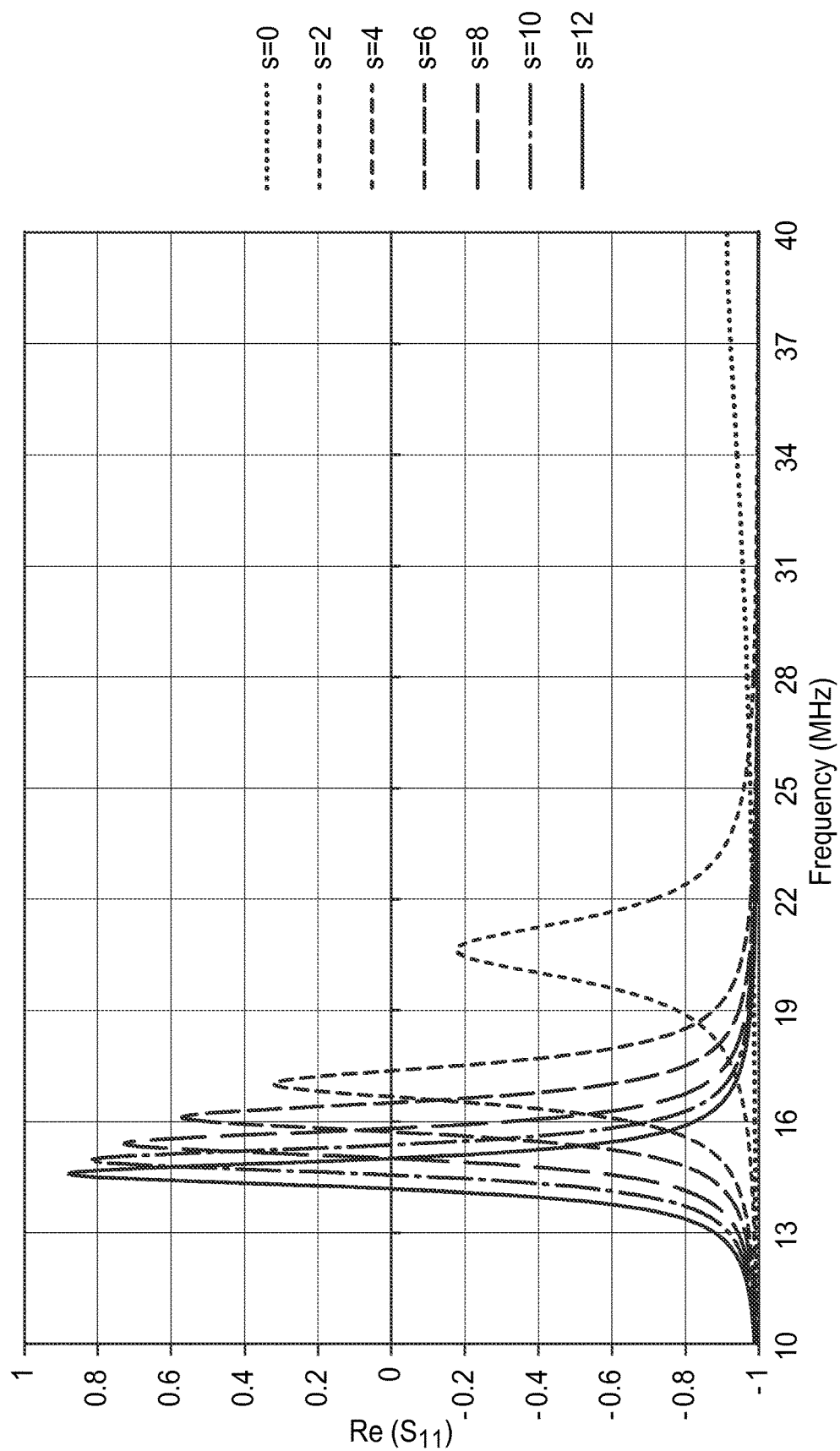
Figure 30A:
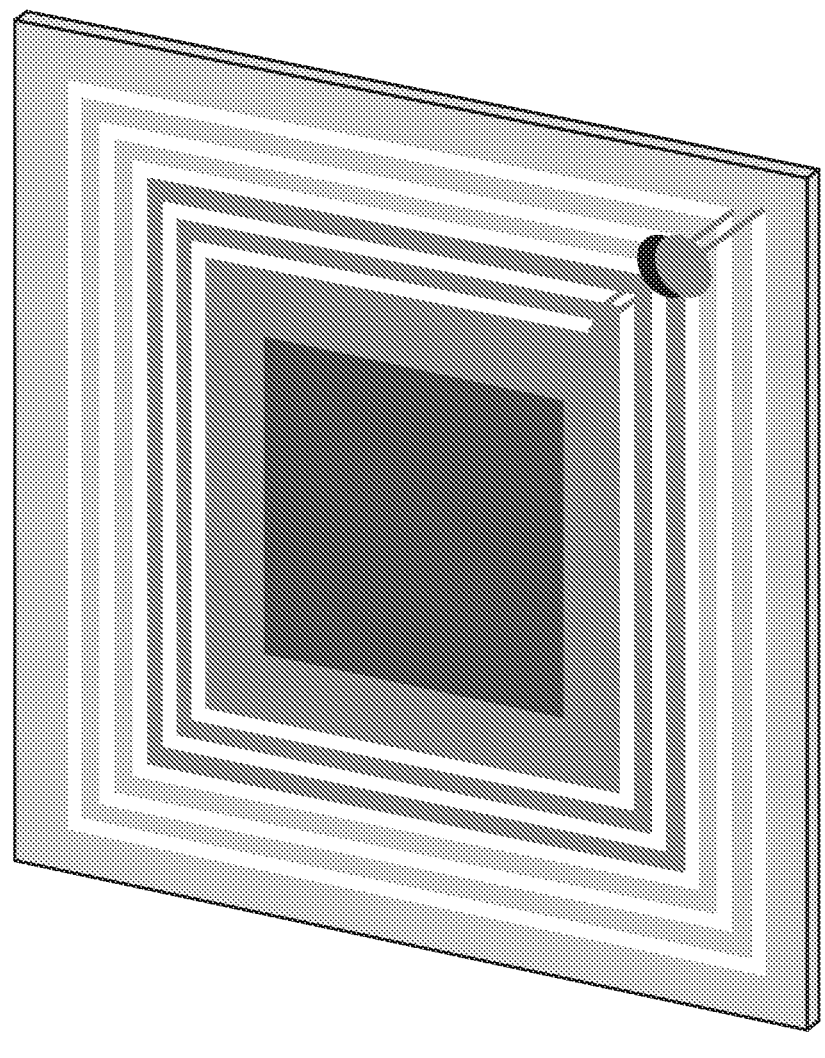
Figure 30B:
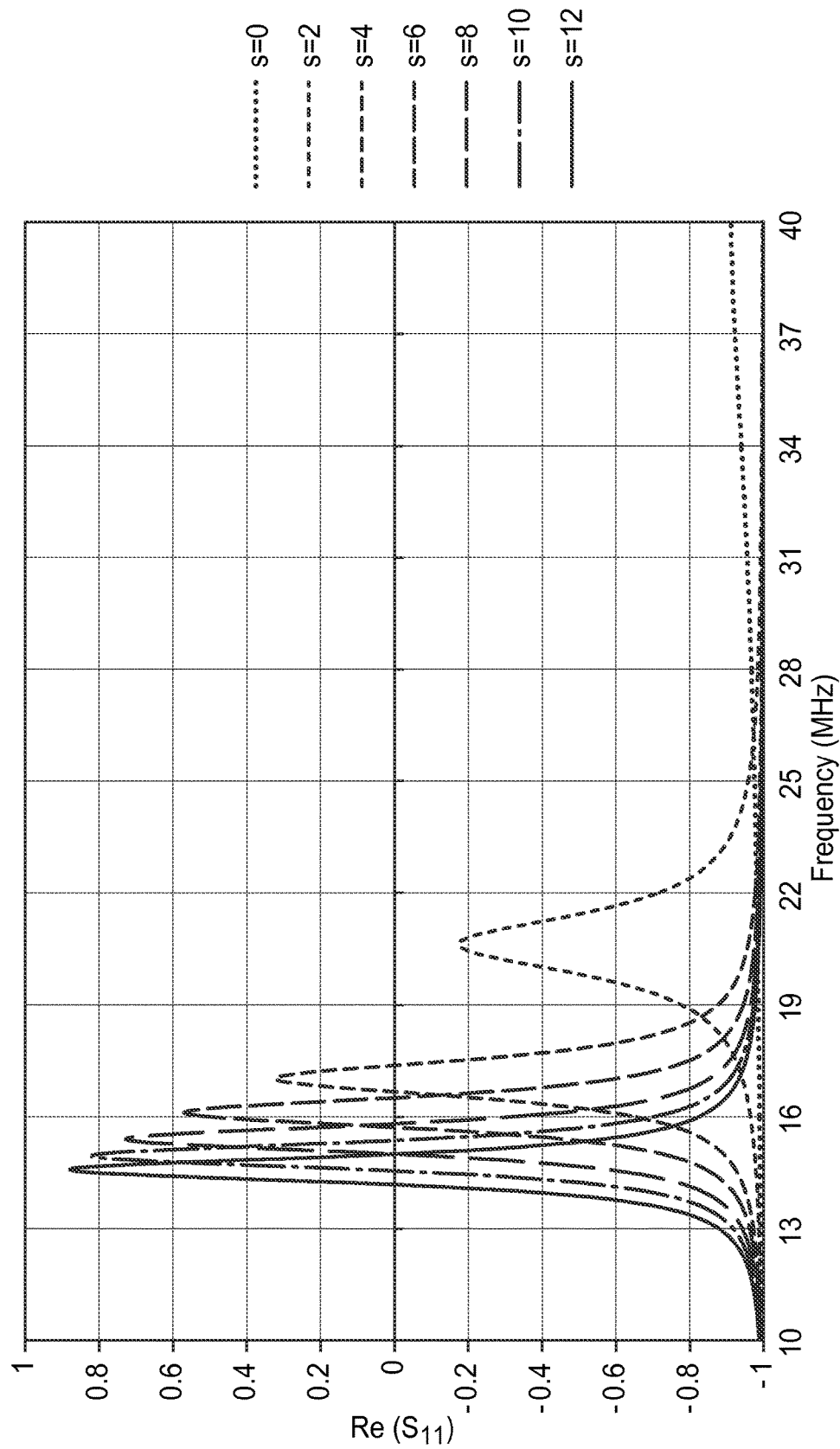

FIG. 29A is a diagram illustrating the conductive-gradient pattern of the first modeled example, and FIG. 29B is a plot illustrating the results from the modeling in terms of frequency versus the real part of reflection coefficient ($Re(S_{11})$). Likewise, FIG. 30A is a diagram illustrating the conductive-gradient pattern of the second modeled example, and FIG. 30B is a plot illustrating the results from the modeling in terms of frequency versus the real part of reflection coefficient ($Re(S_{11})$). These results show the effect of a reference layer with a variable electrical conductivity on the change in resonant frequency.

Various embodiments of the invention have been described. These and other embodiments are within the scope of the following claims.

The invention claimed is:

1. An inductor comprising:
   an inductor layer;
   a reference layer comprising an electrically conductive material, the electrically conductive material being geometrically patterned such that the reference layer includes three or more electrically isolated conductive regions; and
   a variable layer formed between the reference layer and inductor layer, wherein a thickness of the variable layer is configured to change upon application of a force external to the variable layer thereby causing a change in position of the reference layer relative the inductor layer, and wherein the change in position of the reference layer relative the inductor layer changes an inductance of the inductor.

2. The inductor of claim 1, wherein the electrically conductive material comprises electrically conductive particles dispersed within a polymer.

3. The inductor of claim 2, wherein the polymer comprises a polymeric film, foam, or elastomer.

4. The inductor of claim 1, wherein the variable layer comprises a compressible layer, and wherein the thickness of the compressible layer is configured to decrease upon application of the force external to the compressible layer causing the inductance of the inductor to increase.

5. The inductor of claim 1, wherein the variable layer comprises polymeric foam or an elastomeric layer.

6. The inductor of claim 1, wherein the variable layer is directly adjacent to the reference layer and the inductor layer.

7. The inductor of claim 1, wherein the inductor layer is configured as an antenna element.

8. The inductor of claim 1, further comprising:
   an input connection to the inductor layer; and
   an output connection to the inductor layer, wherein the input connection and the output connection are configured to allow the inductor to be connected to a circuit.

9. A sensor comprising the inductor of claim 1, wherein the sensor is configured to detect the force based on the change in inductance of the inductor.

10. The sensor of claim 9, wherein the electrically conductive material comprises electrically conductive particles dispersed within a polymer.

11. The sensor of claim 9, wherein the variable layer comprises a compressible layer, and wherein the thickness of the compressible layer is configured to decrease upon application of the force external to the compressible layer causing the inductance of the inductor to increase.

12. An article comprising the sensor of claim 9.

13. The article of claim 12, wherein the article comprises one of a compression bandage, a compression sleeve, or a compression stocking.

14. The article of claim 12, wherein the electrically conductive material comprises electrically conductive particles dispersed within a polymer.

15. The article of claim 14, wherein the polymer comprises a polymeric film, foam, or elastomer.

16. The article of claim 12, wherein the variable layer comprises a compressible layer, and wherein the thickness of the compressible layer is configured to decrease upon application of the force external to the compressible layer causing the inductance of the inductor to increase.

17. The article of claim 12, wherein the variable layer comprises polymeric foam or an elastomeric layer.

18. The article of claim 12, further comprising a circuit, wherein the circuit comprises:
   an input connection to the inductor layer; and
   an output connection to the inductor layer, wherein the input connection and the output connection are configured to allow the inductor to be connected to the circuit.

19. A system comprising:
   the inductor of claim 1; and
   a circuit coupled to the inductor element via the input and output connectors.

* * * * *